US008336916B1

(12) United States Patent
Clem

(10) Patent No.: US 8,336,916 B1

(45) Date of Patent: Dec. 25, 2012

(54) ROLLS OF IMAGE-CUSTOMIZED VALUE-BEARING ITEMS AND SYSTEMS AND METHODS FOR PROVIDING ROLLS OF IMAGE-CUSTOMIZED VALUE-BEARING ITEMS

(75) Inventor: John Roland Clem, Hermosa Beach, CA (US)

(73) Assignee: Stamps.com Inc., Los Angeles, CA (US)

( * ) Notice: Subject to any disclaimer, the term of this patent is extended or adjusted under 35 U.S.C. 154(b) by 0 days.

(21) Appl. No.: 12/943,519

(22) Filed: Nov. 10, 2010

Related U.S. Application Data

(62) Division of application No. 11/435,453, filed on May 16, 2006, now Pat. No. 7,874,593.

(51) Int. Cl.
*G06F 3/00* (2006.01)
*B42D 15/10* (2006.01)

(52) U.S. Cl. ........................................... 283/71; 283/81

(58) Field of Classification Search .................... 705/60, 705/61, 401, 402, 405, 408, 410; 283/103, 283/105, 117
See application file for complete search history.

(56) References Cited

U.S. PATENT DOCUMENTS

| | | | | |
|---|---|---|---|---|
| 2,148,155 | A * | 2/1939 | Grossman | 493/324 |
| 4,201,339 | A | 5/1980 | Gunn | |
| 4,831,554 | A | 5/1989 | Storace et al. | |
| 4,831,555 | A | 5/1989 | Sansone et al. | |
| 4,864,618 | A | 9/1989 | Wright et al. | |
| 4,872,706 | A | 10/1989 | Brewen et al. | |
| 5,360,628 | A | 11/1994 | Butland | |
| 5,384,886 | A | 1/1995 | Rourke | |
| 5,410,642 | A | 4/1995 | Hakamatsuka et al. | |
| 5,423,573 | A | 6/1995 | de Pasille | |
| 5,425,586 | A | 6/1995 | Berson et al. | |
| 5,449,200 | A | 9/1995 | Andric | |
| 5,471,925 | A | 12/1995 | Heinrich et al. | |
| 5,494,445 | A | 2/1996 | Sekiguchi | |
| 5,502,304 | A | 3/1996 | Berson et al. | |
| 5,510,992 | A | 4/1996 | Kara | |
| 5,524,995 | A | 6/1996 | Brookner et al. | |
| 5,554,842 | A | 9/1996 | Connell et al. | |

(Continued)

FOREIGN PATENT DOCUMENTS

EP 0900830 A1 3/1999

(Continued)

OTHER PUBLICATIONS

Office Action for U.S. Appl. No. 11/435,453, dated Aug. 11, 2009, pp. 1-10, USPTO.

(Continued)

*Primary Examiner* — Dana Ross
*Assistant Examiner* — Pradeep C Battula
(74) *Attorney, Agent, or Firm* — Khorsandi Patent Law Group, A Law Corporation; Marilyn R. Khorsandi

(57) ABSTRACT

Exemplary embodiments of the present invention provide image-customized postage labels, and systems and methods for providing image-customized postage labels, in rolls adapted for high-speed application to mail pieces. The output of the exemplary systems and methods of the present invention is one or more exemplary rolls of liner-backed, self-adhesive, image-customized postage labels per an order placed by a customer. Each of the exemplary rolls comprises a label roll core and an exemplary length of liner-backed, self-adhesive, image-customized postage labels rolled around the label roll core.

15 Claims, 10 Drawing Sheets

U.S. PATENT DOCUMENTS

| | | | |
|---|---|---|---|
| 5,569,317 | A | 10/1996 | Sarada et al. |
| 5,617,519 | A | 4/1997 | Herbert |
| 5,651,238 | A | 7/1997 | Belec et al. |
| 5,666,215 | A | 9/1997 | Fredlund et al. |
| 5,682,318 | A | 10/1997 | Kara |
| 5,717,597 | A | 2/1998 | Kara |
| 5,717,980 | A | 2/1998 | Oka et al. |
| 5,737,729 | A | 4/1998 | Denman |
| 5,801,944 | A | 9/1998 | Kara |
| 5,812,991 | A | 9/1998 | Kara |
| 5,819,240 | A | 10/1998 | Kara |
| 5,923,406 | A | 7/1999 | Brasington et al. |
| 5,932,139 | A | 8/1999 | Oshima |
| 6,005,945 | A | 12/1999 | Whitehouse |
| 6,033,751 | A | 3/2000 | Kline .............................. 428/58 |
| 6,142,380 | A | 11/2000 | Sansone et al. |
| 6,175,826 | B1 | 1/2001 | Malandra et al. |
| 6,181,433 | B1 | 1/2001 | Hayama et al. |
| 6,208,980 | B1 | 3/2001 | Kara |
| 6,234,694 | B1 | 5/2001 | Brookner |
| 6,249,777 | B1 | 6/2001 | Kara |
| 6,311,240 | B1 | 10/2001 | Boone et al. |
| 6,322,192 | B1 | 11/2001 | Walker |
| 6,370,844 | B1 | 4/2002 | Stricker |
| 6,385,504 | B1 | 5/2002 | Pintsov et al. |
| 6,397,328 | B1 | 5/2002 | Pitchenik et al. |
| 6,415,983 | B1 | 7/2002 | Ulvr et al. |
| 6,427,021 | B1 | 7/2002 | Fischer et al. |
| 6,428,219 | B1 | 8/2002 | Stier et al. |
| 6,438,530 | B1 | 8/2002 | Heiden et al. |
| 6,523,014 | B1 | 2/2003 | Pauschinger |
| 6,526,391 | B1 | 2/2003 | Cordery et al. |
| 6,567,794 | B1 | 5/2003 | Cordery et al. |
| 6,595,412 | B2 | 7/2003 | Manduley |
| 6,655,579 | B1 | 12/2003 | Delman et al. |
| 6,671,813 | B2 | 12/2003 | Ananda |
| 6,692,031 | B2 | 2/2004 | McGrew et al. |
| 6,697,822 | B1 | 2/2004 | Armatis et al. |
| 6,701,304 | B2 | 3/2004 | Leon ............................ 705/401 |
| 6,735,575 | B1 | 5/2004 | Kara |
| 6,820,201 | B1 | 11/2004 | Lincoln et al. |
| 6,834,112 | B1 | 12/2004 | Brickell |
| 6,834,273 | B1 | 12/2004 | Sansone et al. |
| 6,868,406 | B1 | 3/2005 | Ogg et al. |
| 6,902,265 | B2 | 6/2005 | Critelli et al. |
| 6,904,168 | B1 | 6/2005 | Steinberg et al. |
| 6,946,960 | B2 | 9/2005 | Sisson et al. |
| 6,948,660 | B2 | 9/2005 | Critelli et al. |
| 7,028,902 | B2 | 4/2006 | Xu et al. |
| 7,039,214 | B2 | 5/2006 | Miller et al. |
| 7,069,253 | B2 | 6/2006 | Leon |
| 7,085,725 | B1 | 8/2006 | Leon |
| 7,117,363 | B2 | 10/2006 | Lincoln et al. |
| 7,127,434 | B2 | 10/2006 | Burningham |
| 7,149,726 | B1 | 12/2006 | Lingle et al. |
| 7,162,460 | B2 | 1/2007 | Cleckler et al. |
| 7,191,158 | B2 | 3/2007 | Ogg et al. |
| 7,191,336 | B2 | 3/2007 | Zeller et al. |
| 7,201,305 | B1 | 4/2007 | Correa |
| 7,222,236 | B1 | 5/2007 | Pagel |
| 7,234,645 | B2 | 6/2007 | Silverbrook et al. |
| 7,243,842 | B1 | 7/2007 | Leon et al. |
| 7,266,531 | B2 | 9/2007 | Pintsov et al. |
| 7,305,556 | B2 | 12/2007 | Slick et al. |
| 7,396,048 | B2 | 7/2008 | Janetzke et al. ................ 283/71 |
| 7,418,599 | B2 | 8/2008 | Peters |
| 7,509,291 | B2 | 3/2009 | McBride et al. |
| 7,577,618 | B2 | 8/2009 | Rajia |
| 7,831,518 | B2 | 11/2010 | Montgomery et al. |
| 2001/0042052 | A1 | 11/2001 | Leon |
| 2001/0054153 | A1 | 12/2001 | Wheeler et al. |
| 2002/0023057 | A1 | 2/2002 | Goodwin et al. |
| 2002/0033598 | A1* | 3/2002 | Beasley .......................... 283/71 |
| 2002/0046195 | A1 | 4/2002 | Martin et al. |
| 2002/0073039 | A1 | 6/2002 | Ogg et al. |
| 2002/0083020 | A1 | 6/2002 | Leon |
| 2002/0083021 | A1 | 6/2002 | Ryan, Jr. et al. |
| 2002/0149195 | A1 | 10/2002 | Beasley |
| 2002/0190117 | A1 | 12/2002 | Manduley |
| 2003/0002709 | A1 | 1/2003 | Wu |
| 2003/0030270 | A1 | 2/2003 | Franko et al. ................... 283/94 |
| 2003/0037008 | A1* | 2/2003 | Raju et al. ....................... 705/60 |
| 2003/0059635 | A1 | 3/2003 | Naasani |
| 2003/0078893 | A1 | 4/2003 | Shah et al. |
| 2003/0088426 | A1 | 5/2003 | Benson et al. |
| 2003/0101143 | A1 | 5/2003 | Montgomery et al. |
| 2003/0101147 | A1 | 5/2003 | Montgomery et al. |
| 2003/0101148 | A1 | 5/2003 | Montgomery et al. |
| 2003/0130954 | A1 | 7/2003 | Carr et al. |
| 2003/0140017 | A1* | 7/2003 | Patton et al. .................. 705/410 |
| 2003/0144972 | A1 | 7/2003 | Cordery et al. |
| 2004/0000787 | A1 | 1/2004 | Vig et al. |
| 2004/0070194 | A1 | 4/2004 | Janetzke et al. ................ 283/71 |
| 2004/0123944 | A1* | 7/2004 | Dorrell et al. ................ 156/250 |
| 2004/0125413 | A1 | 7/2004 | Cordery |
| 2004/0174012 | A1 | 9/2004 | Hagen |
| 2004/0200902 | A1 | 10/2004 | Ishioroshi |
| 2004/0215523 | A1 | 10/2004 | Wulff et al. |
| 2004/0220935 | A1 | 11/2004 | McGraw et al. |
| 2004/0236938 | A1 | 11/2004 | Callaghan |
| 2004/0241424 | A1 | 12/2004 | Barbera-Guillem |
| 2004/0254898 | A1 | 12/2004 | Parker et al. |
| 2005/0065897 | A1 | 3/2005 | Ryan, Jr. et al. |
| 2005/0071296 | A1 | 3/2005 | Lepkofker .................... 705/410 |
| 2005/0071297 | A1 | 3/2005 | Kara |
| 2005/0080751 | A1 | 4/2005 | Burningham |
| 2005/0082818 | A1 | 4/2005 | Mertens |
| 2005/0087605 | A1 | 4/2005 | Auslander et al. |
| 2005/0114276 | A1 | 5/2005 | Hunter et al. |
| 2005/0195214 | A1 | 9/2005 | Reid et al. |
| 2006/0116971 | A1 | 6/2006 | Beckstrom et al. |
| 2006/0136347 | A1 | 6/2006 | Reichelsheimer et al. |
| 2006/0173796 | A1 | 8/2006 | Kara |
| 2006/0287096 | A1 | 12/2006 | O'Kelley et al. |
| 2007/0005518 | A1 | 1/2007 | Beckstrom et al. |
| 2007/0011995 | A1 | 1/2007 | Weaver et al. |
| 2007/0017985 | A1 | 1/2007 | Lapstun et al. |
| 2007/0100672 | A1 | 5/2007 | McBrida et al. .................. 705/6 |
| 2007/0108302 | A1 | 5/2007 | Pintsov et al. |
| 2007/0198441 | A1 | 8/2007 | Kara |
| 2007/0255664 | A1 | 11/2007 | Blumberg et al. ............ 705/408 |

FOREIGN PATENT DOCUMENTS

| | | | |
|---|---|---|---|
| EP | 1096429 | A2 | 5/2001 |
| EP | 1525994 | A2 | 4/2005 |
| JP | 2005132049 | | 5/1993 |
| JP | 2005215905 | | 8/2005 |
| WO | 95/19016 | | 7/1995 |
| WO | 2005042645 | A2 | 5/2005 |
| WO | 2005060590 | A2 | 7/2005 |

OTHER PUBLICATIONS

Office Action for U.S. Appl. No. 11/435,453, dated Apr. 21, 2010, pp. 1-13, USPTO.

Notice of Allowance for U.S. Appl. No. 11/435,453, dated Aug. 5, 2010, pp. 1-18, USPTO.

Kenneth Thomas McBride et al.; "Customized Computer-Based Value-Bearing Item Quality Assurance"; U.S. Appl. No. 10/994,914, filed Nov. 22, 2004; pp. 1-125, including 32 pages of drawings.

Kyle Huebner et al.; "Printing of Customized Computer-Based Value-Bearing Items"; U.S. Appl. No. 10/994,728, filed Nov. 22, 2004; pp. 1-118, including 32 pages of drawings.

JP Leon et al., "Image-Customization of Computer-Based Value-Bearing Items"; U.S. Appl. No. 10/994,698, filed Nov. 22, 2004; pp. 1-125, including 35 pages of drawings.

John Roland Chen et al., "Quality Assurance of Image-Customization of Computer-Based Value-Bearing Items", U.S. Appl. No. 11/114,964, filed Apr. 25, 2005, pp. 1-116, including 32 pages of drawings.

Kenneth Thomas McBride et al., "Image-Customized Labels Adapted for Bearing Computer-Based, Generic, Value-Bearing Items, and Systems and Methods for Providing Image Customized Labels", U.S. Appl. No. 11/475,298, filed Jun. 26, 2006, pp. 1-51, including 9 pages of drawings.

JP Leon; "Systems and Methods for Creating and Providing Shape-Customized, Computer-Based, Value-Bearing Items"; U.S. Appl. No. 11/644,458, filed Dec. 20, 2006; pp. 1-74, including 21 pages of drawings.
JP Leon et al.; "Computer-Based Value-Bearing Item Customization Security"; U.S. Appl. No. 11/729,148, filed Mar. 27, 2007; pp. 1-24.
JP Leon et al.; "Computer-Based Value-Bearing Item Customization Security"; U.S. Appl. No. 11/729,239, filed Mar. 28, 2007; pp. 1-23.
JP Leon, "Invisible Fluorescent Ink Mark"; U.S. Appl. No. 11/509,309, filed Aug. 24, 2006; pp. 1-14, including 2 pages of drawings.
Office Action for U.S. Appl. No. 10/994,914, dated Apr. 17, 2008, pp. 1-22, USPTO.
Office Action for U.S. Appl. No. 10/994,914, dated Dec. 10, 2008, pp. 1-28, USPTO.
Office Action for U.S. Appl. No. 10/994,728, dated May 29, 2008, pp. 1-18, USPTO.
Office Action for U.S. Appl. No. 10/994,728, dated Jan. 26, 2009, pp. 1-16, USPTO.
Office Action for U.S. Appl. No. 10/994,698, dated Aug. 19, 2008, pp. 1-19, USPTO.
Office Action for U.S. Appl. No. 10/994,698, dated Mar. 4, 2009, pp. 1-16, USPTO.
Notice of Allowance for U.S. Appl. No. 10/994,768, now Pat. No. 7,243,842, pp. 1-8, dated Jan. 5, 2007, USPTO.
Office Action for U.S. Appl. No. 10/114,964, dated Nov. 26, 2008. pp. 1-15, USPTO.
Office Action for U.S. Appl. No. 11/475,298, dated Jan. 21, 2009, pp. 1-14, USPTO.
Office Action for U.S. Appl. No. 11/644,458, dated Apr. 16, 2009, pp. 1-16, USPTO.
Office Action for U.S. Appl. No. 11/635,871, dated Jun. 19, 2007, pp. 1-5, USPTO.
Office Action for U.S. Appl. No. 11/635,871, dated Dec. 12, 2007, pp. 1-6, USPTO.
Notce of Alowance for U.S. Appl. No. 11/635,871 dated Jul. 15, 2008, pp. 1-10, USPTO.
Notice of Alowance for U.S. Appl. No. 11/635,871, dated Nov. 17, 2008, pp. 1-12, USPTO.
Office Action for U.S. Appl. No. 11/509,309, dated May 29, 2007, pp. 1-14, USPTO.
Office Action for U.S. Appl. No. 11/509,309, dated Oct. 16, 2007, pp. 1-21, USPTO.
Office Action for U.S. Appl. No. 11/509,309, dated Apr. 15, 2008, pp. 1-13, USPTO.
Office Action for U.S. Appl. No. 11/509,309, dated Sep. 30, 2008, pp. 1-16, USPTO.
Office Action for U.S. Appl. No. 11/509,309, dated Jan. 30, 2009, pp. 1-15, USPTO.
Canada Post Corporation, "Collecting Picture Postage", http://www.canadapost.ca/personal/collecting/default-e.asp?stamp=postage, © 2004, 3 pages.
Personal Postage Corporation, "Personal Postage", http://www personalpostage.com, undated, printed on Jul. 20, 2004, 1 page.
Personal Postage Corporation, "Personal Postage", http://www.personalpostage.com/home.htm, undated, printed on Jul. 20, 2004, 2 pages.
Canada Post International, LLC; "Personal Postage", http://www.personalpostage.com/Canada%20Post.htm, Undated, printed Jul. 20, 2004, 2 pages.
Personal Postage Corporation; "Quick Reference Guide"; http://www.personalpostage.com/Om_page1.htm, page2.htm, page3.htm, page4.htm, Undated, printed Jul. 20, 2004, 8 pages.
Avery Dennison Corporation; "Avery Creative Postage Labels"; http://www.creativepostagelabels.avery.com/postage_aap.html; © 1996-2004, 4 pages.
Avery Dennison Corporation; "Avery Creative Postage Labels", http://www.creativepostagelabels.avery.com/order.php, © 1996-2004, 2 pages.
Canadian Post, picture stamp sample, undated, prior to Jul. 27, 2004, 1 page.
Canadian Post, Set of pictures and address labels; sample, undated, prior to Jul. 27, 2004, 1 page.
Jay Bigalke, "Small business personalized stamps", publication date unknown; publicaton unknown; undated; article shows stamp label bearing a date of Jan. 14, 2006, 1 page.
Pitney Bowes, "Create personal postage—Custom postage Stamp Expressions Printer, How the Stamp Expressions Printer Works", http://www.stampexpressions.com/how_it_works.cfm; undated, printed Nov. 11, 2009, 2 pages.
John Roland Clem; "Auromatic Guarantee Delivery Tracking and Reporting for United States Postal Service Postage Refunds for Paid Computer-Based Postage"; U.S. Appl. No. 12/500,970, filed Jul. 10, 2009.
Final Office Action for U.S. Appl. No. U.S. Appl. No. 11/114,964, dated Jun. 23, 2009, pp. 1-14, USPTO.
Rupert Steiner, "It's in the mail; a personalized postcode for life", an article about Royal Mail picture stamps, date unknown (prior to Jul. 27, 2004), publication unknown, 1 page.
Australian Post sample; Jul. 7-16, 2000; Anaheim, CA, 1 page.
Menezes, A.J., et al."Handbook of Applied Cryptography", CRC Press LLC, 1997 (Excerpt—cover pages and pp. 512-515).
"What's selling: from bricks and mortar to bricks and clicks". Playthings Magazine, Feb. 1, 2003, 3 pages.
Porter, William "Personal Postage Canadians take to vanity stamps in very big way". Denver Post, Jul. 9, 2000, 2 pages.
"Picture It Postage by endicia," http://www.pictureitpostage.com/PhotoEditor/EditImage.cfm, Endicia; printed on Nov. 17, 2006; 2 pages.
"Zazzle Custom Stamps for Business; Zazzel.com Pitney Bowes," http://www.zazzle.com/stamps/design.asp, Pitney Bowes; printed on Nov. 16, 2006; 2 pages.
"Information-Based Indicia Program (IBIP) Performance Criteria for Information-Based Indicia and Security Architecture for Closed IBI Postage Metering Systems (PCIBI-C)", United States Postal Service, Published Jan. 12, 1999, Entire Document, pp. 1-49.
2nd Notice of Allowance for U.S. Appl. No. 10/197,044, dated Nov. 24, 2008, pp. 1-10, USPTO.
Office Action for U.S. Appl. No. 10/994,914, date Aug. 26, 2009, pp. 1-35, USPTO.
Office Action for U.S. Appl. No. 10/994,728, dated Aug. 19, 2009, pp. 1-14, USPTO.
Office Action for U.S. Appl. No. 10/994,698, dated Aug. 3, 2009, pp. 1-14, USPTO.
Office Action for U.S. Appl. No. 11/475,298, dated Sep. 15, 2009, pp. 1-22, USPTO.
JP Leon; "Mail Piece Processing", U.S. Appl. No. 12/316,542, filed Dec. 11, 2006.
Office Action for U.S. Appl. No. 10/994,914, dated Mar. 15, 2010, pp. 1-31, USPTO.
Office Action for U.S. Appl. No. 10/994,728, dated Mar. 16, 2010, pp. 1-14, USPTO.
Office Action for U.S. Appl. No. 10/994,598, dated May 11, 2010, pp. 1-22, USPTO.
Office Action for U.S. Appl. No. 11/114,964, dated Dec. 23, 2009, pp. 1-21, USPTO.
Office Action for U.S. Appl. No. 11/114,964, dated Jun. 30, 2010, pp. 1-27, USPTO.
Office Action for U.S. Appl. No. 11/644,458, dated Dec. 4, 2009, pp. 1-17, USPTO.
Office Action for U.S. Appl. No. 11/544,458, dated May 7, 2010, pp. 1-99, USPTO.
Office Action for U.S. Appl. No. 11/729,148, dated May 13, 2010, pp. 1-15, USPTO.
Office Action for U.S. Appl. No. 11/729,239, dated Dec. 9, 2009, pp. 1-7, USPTO.
Notice of Allowance for U.S. Appl. No. 11/729,239, dated Jun. 24, 2010, pp. 1-21, USPTO.
Office Action for U.S. Appl. No. 10/991,241, dated Jul. 19, 2005, pp. 1-16, USPTO.
Office Action for U.S. Appl. No. 10/991,241, dated Jan. 31, 2005, pp. 1-13, USPTO.
Office Action for U.S. Appl. No. 10/991,241, dated Oct. 31, 2006. pp. 1-14, USPTO.
Office Action for U.S. Appl. No. 10/991,241, dated Jul. 12, 2007, pp. 1-16, USPTO.

Office Action for U.S. Appl. No. 10/991,241, dated Dec. 31, 2007, pp. 1-15, USPTO.

Office Action for U.S. Appl. No. 10/991,241, dated Jul. 7, 2008, pp. 1-13, USPTO.

Examiner's Answer for U.S. Appl. No. 10/991,241, dated Feb. 19, 2009, pp. 1-14, USPTO.

Appeal Decision for U.S. Appl. No. 10/991,241, dated Apr. 20, 2010, pp. 1-9, USPTO.

Notice of Abandonment for U.S. Appl. No. 10/991,241, dated Jun. 30, 2010, pp. 1-2, USPTO.

Interview Summary for U.S. Appl. No. 11/644,458, dated Sep. 2, 2010, pp. 1-7, USPTO.

Notice of Allowance for U.S. Appl. No. 11/729,148, dated Sep. 1, 2010, pp. 1-74, USPTO.

Kenneth Thomas McBride et al. "Customized Computer-Based Value-Bearing Item Quality Assurance"; U.S. Appl. No. 13/275,704, filed Oct. 18, 2011, Preliminary Amendment, pp. 1-12.

Office Action for U.S. Appl. No. 11/475,298, dated Feb. 14, 2012, pp. 1-15, USPTO.

Office Action for U.S. Appl. No. 13/081,356, dated May 31, 2012, pp. 1-10, USPTO.

Office Action for U.S. Appl. No. 13/103,886, dated Feb. 15, 2012, pp. 1-14, USPTO.

* cited by examiner

FIG. 1A
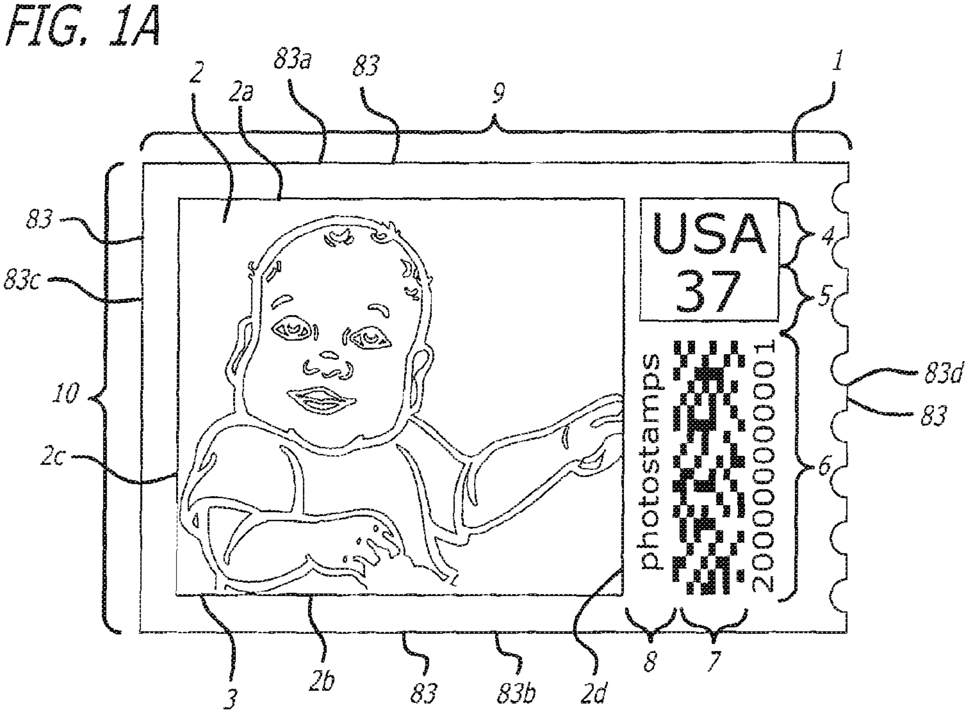
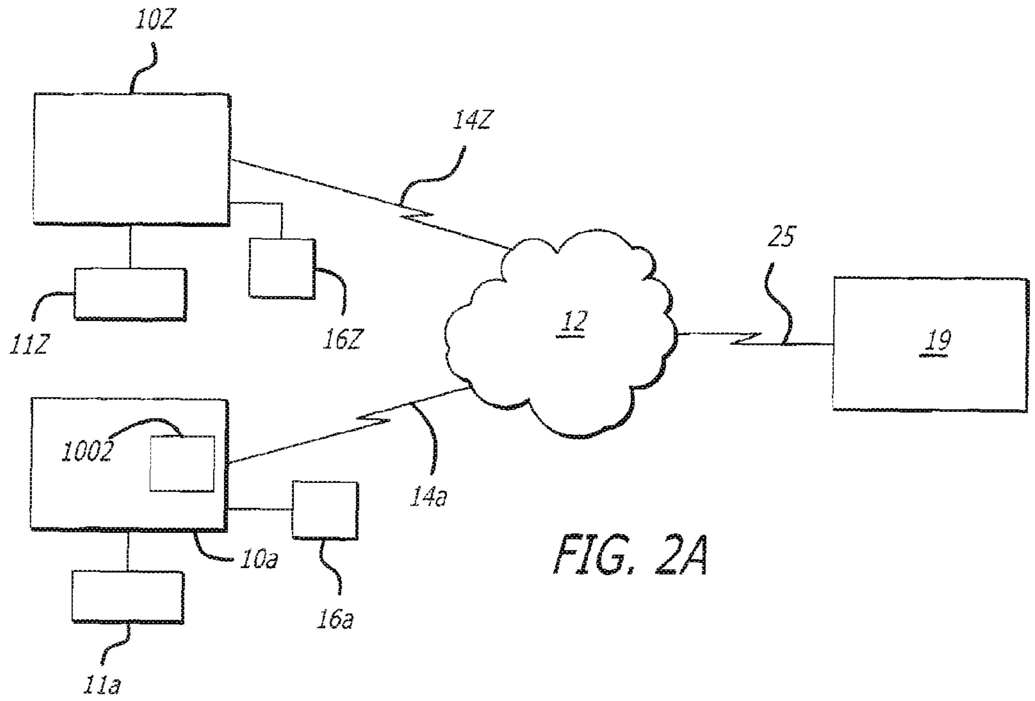
FIG. 2A

FIG. 1B-2
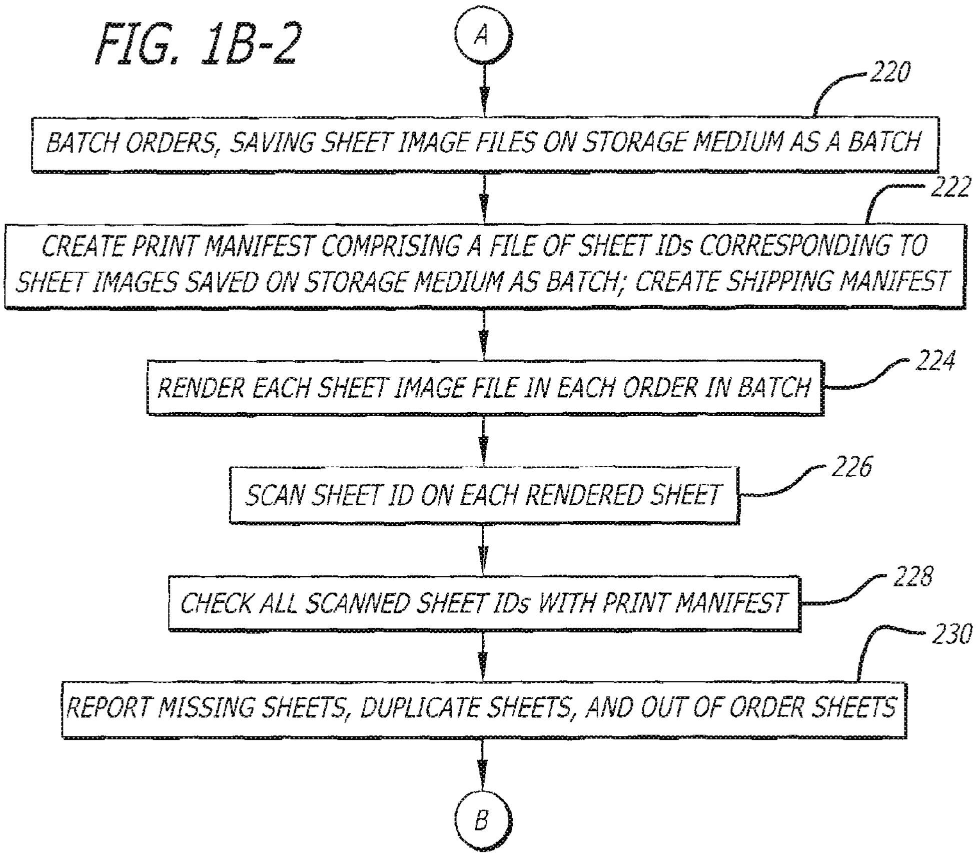
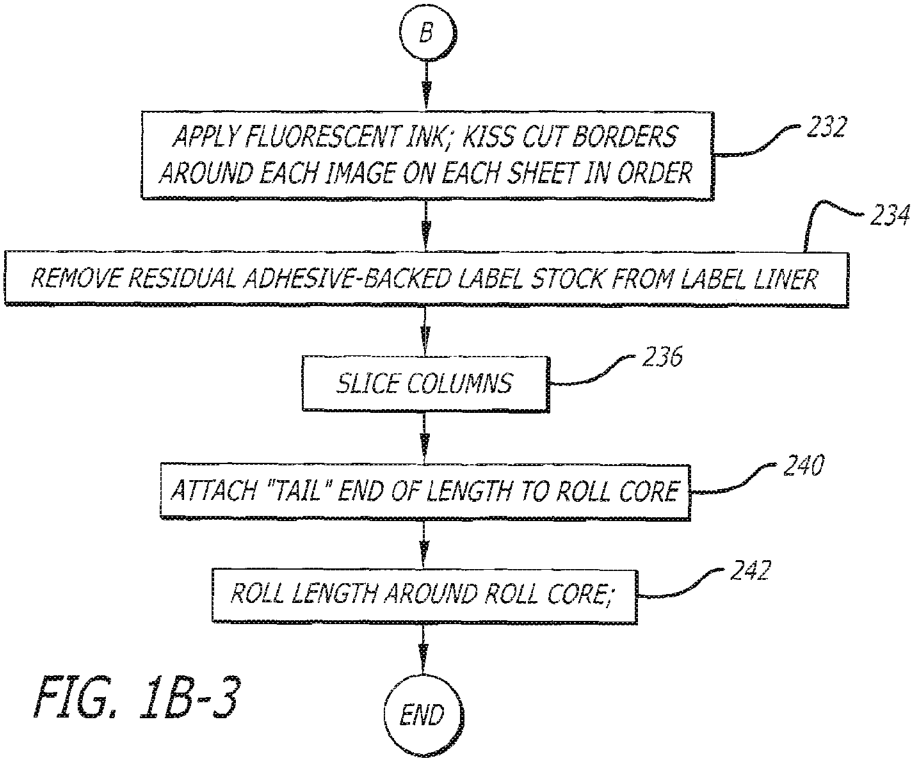
FIG. 1B-3

| INDICIA CONTENT DESCRIPTION |
|---|

INDICIA CONTENT

IBI VERSION 06062S
MATS MODEL ID N/A
PSD IBM 4758 HOST

| FIELD ORDER IN INDICIA | FIELD LENGTH BYTES | FIXED VALUE | FORMAT | DESCRIPTION |
|---|---|---|---|---|
| 1 | 1 | 06 | BINARY | INDICIA VERSION 441 |
| 2 | 2 | | BINARY | SOFTWARE ID 442 |
| 3 | 3 | | BINARY | POSTAGE VALUE 443 |
| 4 | 2 | 06 | TEXT | IBI VENDOR 444 |
| 5 | 2 | 2S | BINARY | MODEL ID 445 |
| 6 | 8 | | BINARY | INDICIA ID NUMBER 446 |
| 7 | 2 | | BINARY | ENCODER VALUES 447 |

TOTAL BYTES = 20

FIG. 4

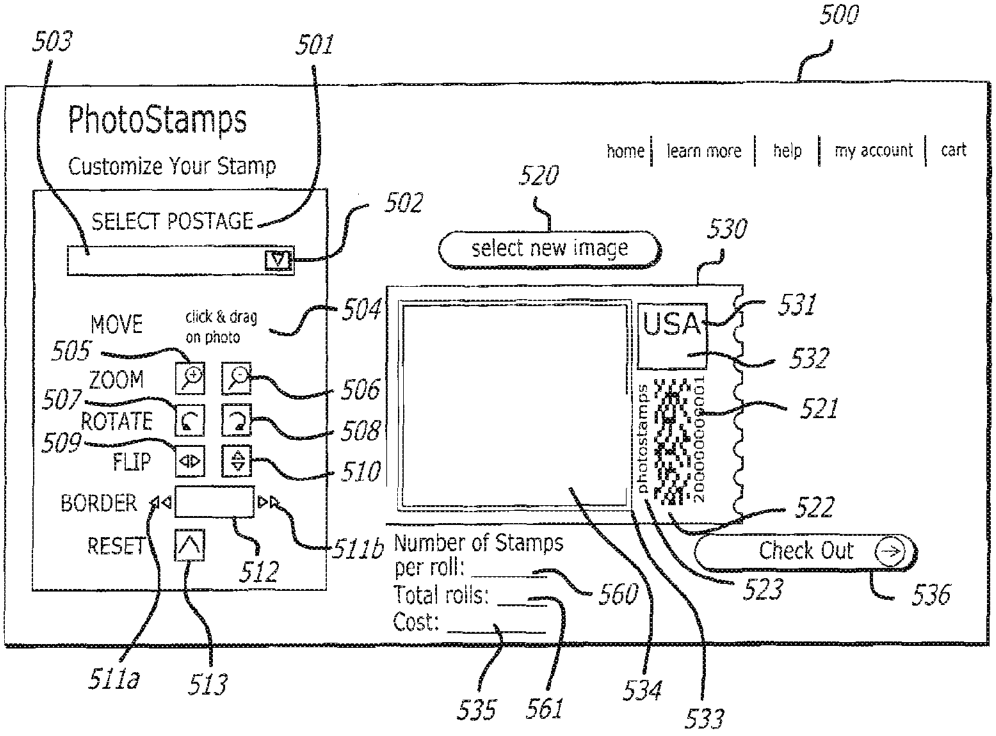
FIG. 5
FIG. 6
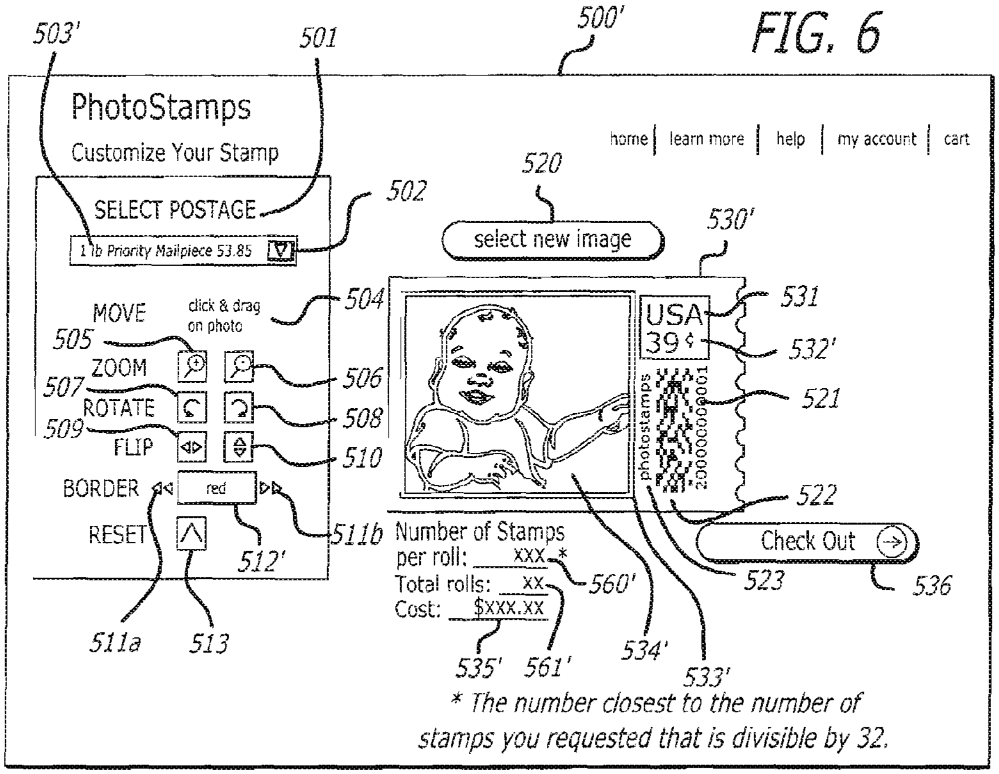

ROLLS OF IMAGE-CUSTOMIZED VALUE-BEARING ITEMS AND SYSTEMS AND METHODS FOR PROVIDING ROLLS OF IMAGE-CUSTOMIZED VALUE-BEARING ITEMS

CROSS-REFERENCE TO RELATED APPLICATIONS

This is a divisional application of, and this application claims priority to, U.S. application Ser. No. 11/435,453, which was filed on May 16, 2006 now U.S. Pat. No. 7,874, 593, titled "ROLLS OF IMAGE-CUSTOMIZED VALUE-BEARING ITEMS AND SYSTEMS AND METHODS FOR PROVIDING ROLLS OF IMAGE-CUSTOMIZED VALUE-BEARING ITEMS," the entire disclosure of which is incorporated herein in full by reference as if stated in full herein.

FIELD OF THE INVENTION

The field of the present invention is computer-based value-bearing items, and particularly, image-customized computer-based value-bearing items such as, for example, image-customized, computer-based postage-indicia-bearing items.

BACKGROUND OF THE INVENTION

Many companies use the postal system as a means for delivering marketing and other information to people, such as potential customers. Such companies may send a high volume of such marketing and/or other information through the postal system. Marketing research has shown that mail bearing a postage stamp has a higher open rate than mail bearing meter-based postage indicia.

Many high-volume postage users use pre-cancelled stamps offered by the United States Postal Service ("USPS"). Pre-canceled stamps are special stamps that come in various denominations, including, for example, twenty-five (25) cent stamps for pre-sorted First-Class Mail; fifteen (15) cents for pre-sorted First-Class cards; ten (10) cents for regular standard mail; and five (5) cents for non-profit standard mail. Each denomination of pre-cancelled stamps bears a standard USPS-provided image for that particular denomination.

Mailers can buy the pre-canceled stamps at the lower rate. However, when a mail piece bearing such a pre-canceled stamp is mailed, the USPS charges the mailer the difference between what has already been paid and the amount of postage for the type of mail piece mailed. For example, if a mailer purchased a fifteen (15) cent stamp for mailing a pre-sorted First-Class postcard which requires, for example, twenty-four (24) cents postage, then when the mailer mails the pre-sorted First-Class postcard, the mailer must pay the difference of nine (9) cents between the cost of the fifteen (15) cent stamp and the twenty-four (24) cents cost for mailing a pre-sorted First-Class postcard.

Pre-cancelled stamps are sold by the USPS in rolls of 500, 3,000, or 10,000 stamps. Special machines exist for high-speed application of rolls (sometimes referred to as "coils") of postage to mail pieces. Such machines are sometimes referred to as stamp affixers.

Instead of the standard USPS-provided image on pre-cancelled stamps, some mailers may prefer to send their mail pieces with postage labels bearing custom images. For example, if the USPS approves use of commercial images and brands for use on image-customized postage labels, some commercial entity mailers may, for example, want to use customized postage labels as additional marketing for their company or their company's products or services.

Image-customized postage labels have been available to the U.S. public for some time. For example, Stamps.com Inc. provides image-customized postage labels under the name of PHOTOSTAMPS®. U.S. patent application Entitled: "IMAGE-CUSTOMIZATION OF COMPUTER-BASED VALUE-BEARING ITEMS"; application Ser. No. 10/994, 698, filed on Nov. 22, 2004 and its entire contents and disclosure is incorporated by reference in full herein for all purposes as if fully stated here.

However, PHOTOSTAMPS® and other image-customized postage labels have not been available in a form useable by high-speed postage application machines. Therefore, high-volume mailers that want to use image-customized postage have not had image-customized postage labels available in a form useable by the high-speed postage application machines used by, or for, such mailers.

Further, high-volume mailers that want to purchase rolls of stamps that can be used in high-speed postage application machines have not been able to purchase quantities of such stamps other than in the quantities provided by the USPS.

SUMMARY OF THE INVENTION

Exemplary embodiments of the present invention provide image-customized postage labels, and systems and methods for providing image-customized postage labels, in rolls adapted for high-speed application to mail pieces.

The output of the exemplary systems and methods of the present invention will be one or more exemplary rolls of liner-backed, self-adhesive, image-customized postage labels according to an order placed by a customer. Each of the exemplary rolls will comprise a label roll core. As will be understood by someone with ordinary skill in the art, an exemplary label roll core may comprise, for example, a hollow cylinder of some core material, such as stiff cardboard, around which a length of material can be rolled. In the case of the exemplary embodiment of the present invention, the length of material to be rolled around the roll core will comprise an exemplary length of liner-backed, self-adhesive, image-customized postage labels.

In the exemplary embodiment, the exemplary length of liner-backed, self-adhesive, image-customized postage labels will comprise an exemplary length of label liner backing on which a plurality of adhesive-backed, image-customized postage labels are disposed.

As will be understood by someone with ordinary skill in the art, a length of material to be rolled around a roll core will have a first end, sometimes referred to as a "tail" end, that can be attached to a roll core; a length of material to be rolled around a roll core will have a second end, sometimes referred to as the "dispensing" end. As will be understood by someone with ordinary skill in the art, the dispensing end is the outermost end of a roll of material.

In the exemplary embodiment of the present invention, the exemplary length of label liner backing will comprise a first end (the "tail" end) disposed on the label roll core, and a second end (the "dispensing" end). The exemplary length of label liner backing will comprise an upper liner surface, and an underneath liner surface.

The exemplary length of liner-backed, self-adhesive, image-customized postage labels will comprise a plurality of exemplary adhesive-backed, image-customized postage labels disposed on the upper liner surface. Each of the exemplary adhesive-backed, image-customized postage labels will comprise an upper label surface and an underneath label surface. An adhesive is disposed on the underneath label surface of each exemplary adhesive-backed, image-customized postage label. The upper label surface of each exemplary adhesive-backed, image-customized postage label will comprise a customized image, a machine-readable postage indicia, and a human-readable postage indicia. The underneath label surface is separably adhered to the upper liner surface.

In the exemplary embodiment, an invisible fluorescent ink is disposed on a portion of the upper label surface of each exemplary adhesive-backed, image-customized postage label.

In the exemplary embodiment of the present invention, an exemplary method for producing an exemplary roll of image-customized postage labels will comprise a customer representative receiving a request from a customer for a roll of a certain number of exemplary image-customized postage labels. In the exemplary embodiment, the customer representative will enter the order into an exemplary image-customizing postal label computer system. It will be understood by someone with ordinary skill in the art that the description of a customer representative receiving a customer's order is not a limitation of the present invention. Rather, in an alternative embodiment, a customer could enter an order directly into the exemplary image-customizing postal label computer system without departing from the spirit of the invention.

In the exemplary embodiment of the present invention, the exemplary method for producing an exemplary roll of image-customized postage labels will further comprise a customer representative directing the exemplary image-customizing postal label computer system to upload a digital image provided by the customer.

The customer representative will use online user interface tools to enter details about the order, such as the postage denomination amount for each postage label, and the number of postage labels ordered.

The customer representative will use online user interface tools to manipulate the digital image to provide the orientation and effect directed or requested by the customer. Once the image is properly oriented and presented, the order can be submitted for fulfillment to the exemplary image-customizing postal label computer system.

In the exemplary embodiment of the present invention, once an order has been submitted, the exemplary image-customizing postal label computer system will assign the order an order number and will stage the order for pre-print Quality Assurance.

In the exemplary embodiment of the present invention, pre-print Quality Assurance will be managed by the exemplary image-customizing postal label computer system. The exemplary image-customizing postal label computer system will queue the ordered image for review by one or more pre-print Quality Assurance reviewers/users. When the position of an ordered image in the queue is ready for review, the exemplary image-customizing postal label computer system will present the ordered image for review by one or more pre-print Quality Assurance reviewers/users and will receive an indication from the one or more pre-print Quality Assurance reviewers/users of approval or denial of the ordered image.

In the exemplary embodiment of the present invention, the exemplary image-customizing postal label computer system will format for rendering on printable label stock, "sheets" of image-customized postage labels.

In the exemplary embodiment of the present invention, an exemplary "sheet" will comprise eight (8) columns and four (4) rows of image-customized postage labels. Therefore, in the exemplary embodiment, there will be thirty-two (32) image-customized postage labels on each exemplary "sheet". Once the image for an order has passed pre-print Quality Assurance, a number of "sheets" will be calculated (sometimes referred to herein as the "total sheets [or files] in the order").

In the exemplary embodiment of the present invention, each image-customized postage label will be surrounded on all sides by a blank sheet area.

In the exemplary embodiment of the present invention, in order to calculate the number of "sheets", the exemplary image-customizing postal label computer system will be programmed to multiply the exemplary number of four (4) rows by the exemplary number of eight (8) columns to produce the result of thirty-two (32) image-customized postage labels per exemplary "sheet". Alternatively, the number thirty-two (32) will simply be provided to the exemplary image-customizing postal label computer system as the standard number of image-customized postage labels per exemplary "sheet".

In the exemplary embodiment of the present invention, the exemplary image-customizing postal label computer system will be programmed to divide the number of image-customized postage labels ordered by the customer by the standard number of image-customized postage labels per exemplary "sheet" to calculate a certain number of "sheets" of image-customized postage labels that need to be formatted and rendered on printable label stock.

In the exemplary embodiment of the present invention, once the number of "sheets" has been calculated, the exemplary image-customizing postal label computer system will be programmed to format each "sheet" of the certain number of "sheets" that need to be formatted.

In the exemplary embodiment of the present invention, for each "sheet" to be formatted, the exemplary image-customizing postal label computer system will be programmed to generate and format a sheet image of a plurality of (in the exemplary embodiment, specifically, thirty-two (32)) image-customized postage labels. In the exemplary embodiment of the present invention, each sheet image will comprise four (4) rows of image-customized postage labels and eight (8) columns of image-customized postage labels.

In the exemplary embodiment of the present invention, each image-customized postage label will comprise a customized image, a machine-readable postage indicia, a human readable serial number, and a human readable country/human-readable postage indicia. Therefore, in order to format a sheet image, for each "Sheet" in an order, for each label on the "Sheet", the exemplary image-customizing postal label computer system will be programmed to generate a unique serial number and a machine-readable postage indicia and will be programmed to format the respective label image and format the respective label image as it will appear on the "sheet" in a particular column and row of the sheet image.

In the exemplary embodiment of the present invention, the exemplary image-customizing postal label computer system will be programmed to generate and assign to each sheet image a Sheet Identifier ("Sheet ID") that identifies the corresponding "sheet". Exemplary Sheet ID's will be generated to comprise elements described further below.

In the exemplary embodiment of the present invention, once a Sheet ID is assigned to a sheet image, the exemplary image-customizing postal label computer system will be programmed to format a barcode comprising a machine-readable representation of the Sheet ID and to incorporate the barcode in an area of a perimeter margin of the corresponding sheet. In the exemplary embodiment of the present invention, the exemplary image-customizing postal label computer system will be programmed to create and format "eye marks" and to incorporate the "eye marks" in certain areas of the perimeter margins of the corresponding sheet.

As will be understood by someone with ordinary skill in the art, "eye marks" can be used by certain finishing equipment to, for example, apply surface features to a printed product. In the exemplary embodiment of the present invention, "eye marks" will be formatted and incorporated as part of each exemplary sheet image to guide application by certain finishing equipment in the positional application of invisible fluorescent ink on the printed surface of each image-customized postage label.

In the exemplary embodiment of the present invention, once a sheet image has been completely formatted, including all thirty-two (32) image-customized postage label images, a machine-readable Sheet ID barcode image, and "eye mark" images, the exemplary image-customizing postal label computer system will be programmed to save the sheet image as a file with a particular file name as described further below.

In the exemplary embodiment of the present invention, the Sheet ID's and sheet image file names will comprise a file group ID of "900", an order counter that identifies a particular order (such as, for example, the Order ID), a sheet/file number (which represents the particular sheet/file within the order), and a total sheets/files in the order (which remains fixed for each order and which was calculated as previously described above by dividing the total number of postage labels ordered by thirty-two (32)).

In the exemplary embodiment of the present invention, the exemplary image-customizing postal label computer system will be programmed to periodically batch orders by saving a batch of saved sheet image files for one or more orders onto a storage medium, such as, for example, an encrypted hard drive for printing. The exemplary image-customizing postal label computer system will be programmed to also create a Print Manifest, comprising a file of the Sheet ID's corresponding to the sheet image files saved on the storage medium as the batch.

In the exemplary embodiment of the present invention, the sheet image files saved in the batch will have been sorted so that the sheet/file numbers within the order (in the Sheet ID/File Name) are in sequential order. In the exemplary embodiment of the present invention, the exemplary image-customizing postal label computer system will be programmed to count the total number of sheets/files in a batch and ensure that all of the sheets/files in the batch are present and in sequential order, as compared to the total sheets/files in the order (as previously described above as an element of the Sheet ID/File Name).

In the exemplary embodiment of the present invention, the batched files will then be provided to a print-rendering device. In the exemplary embodiment of the present invention, the print rendering device, an HP® Indigo press ws4050 printer, will render each sheet image file in each order in the batch on to a respective sheet portion of a roll of liner-backed adhesive label stock.

In the exemplary embodiment of the present invention, once the sheet images for an order have been printed, the Sheet ID barcode on each sheet will be scanned. An exemplary print manifest computer program will be executed that will check all of the scanned Sheet ID's for an order to ensure that all of the sheets in an order have been printed, that no duplicate sheets have been printed, and that all of the sheets are sequentially ordered. Missing sheets, duplicate sheets and out of order sheets will be reported for manual resolution.

Fluorescent ink will be applied to each printed postage label to facilitate cancellation by the postal service.

In the exemplary embodiment of the present invention, the printed label stock for all "Sheets" in an order will then be fed through a special piece of equipment that will kiss-cut a border around each image-customized postage label on each sheet image on each "Sheet" in the order. It will be understood by someone with ordinary skill in the art that, in the exemplary embodiment, a kiss-cut will pierce the adhesive-backed label but will not pierce the label liner. Because there is a space between each image-customized postage label, kiss-cutting a border around each image-customized postage label will leave residual adhesive-backed label stock in between the borders.

In the exemplary embodiment of the present invention, once the labels for an order have been kiss-cut, the label stock for the order will be fed through a piece of equipment that will remove the residual adhesive-backed label stock from the label liner. Also, the perimeter borders of each sheet will be trimmed, removing the Sheet ID barcode and the "eye marks."

In the exemplary embodiment of the present invention, once the residual adhesive-backed label stock has been removed from the label liner and the perimeter borders have been trimmed, the portion of the roll of liner-backed adhesive label stock comprising all of the "Sheets" for the order will be fed through a piece of equipment that will slice the roll in between each column of image-customized postage labels.

In the exemplary embodiment of the present invention, once the columns have been sliced, the sliced columns of liner-backed, image-customized postage labels will have a first "tail" end and a second "dispensing" end. The first "tail" end of the spliced length of liner-backed, image-customized postage labels will be attached to a roll core. The sliced columns of liner-backed, image-customized postage labels will then be rolled around the roll core to form a roll of image-customized postage labels. In the exemplary embodiment, the sliced columns of liner-backed, image-customized postage labels will be rolled around the roll core clock-wise.

Depending on the specification of a particular order, the sliced columns may be spliced together to form one or more rolls of image-customized postage labels for the order.

In one alternative exemplary embodiment of the present invention, each order would be formatted for a particular column of a plurality of sheets. That is, each column on a particular sheet would correspond to a customized image and a postage denomination amount of a particular order. In such an alternative exemplary embodiment of the present invention, a sheet of liner-backed self-adhesive image-customized postage labels would comprise a plurality of columns of image-customized postage labels, wherein each image-customized postage label in a particular column of the plurality of columns would comprise a particular image of a plurality of images, wherein the plurality of images would correspond to the plurality of columns, and wherein each image of the plurality of images would correspond to a particular respective order of a plurality of orders.

BRIEF DESCRIPTION OF THE DRAWINGS

These and other features, aspects, and advantages of the present invention will become better understood with regard to the following description, appended claims, and accompanying drawings in which:

FIG. 1A depicts a plan view of an exemplary image-customized postage label 1 in an exemplary embodiment of the present invention;

FIG. 1B, comprising FIGS. 1B-1 through 1B-3, is a high-level flow diagram depicting exemplary high level logic functions for producing an exemplary roll of image-customized postage labels in an exemplary embodiment of the present invention (Reference herein to FIG. 1B will be understood to refer to the collection of FIGS. 1B-1 through 1B-3);

FIG. 2A is a block diagram depicting an exemplary Internet user client/server environment for the exemplary image-customizing postal label computer system in an exemplary embodiment of the present Invention;

FIG. 3 is a graphic representation depicting a screen shot of an exemplary user interface order type screen in an exemplary embodiment of the present invention;

FIG. 4 is a chart depicting content format for exemplary machine-readable postage indicia in an exemplary embodiment of the present invention;

FIG. 5 is a graphic representation depicting a screen shot of an exemplary user interface blank postage label template screen that depicts a representation of an exemplary blank customizable postage label template in the exemplary embodiment of the present invention;

FIG. 6 is a graphic representation depicting a screen shot of an exemplary user interface customized postage label preview screen in the exemplary embodiment of the present invention;

DETAILED DESCRIPTION OF THE INVENTION

Figures 1, 1B:
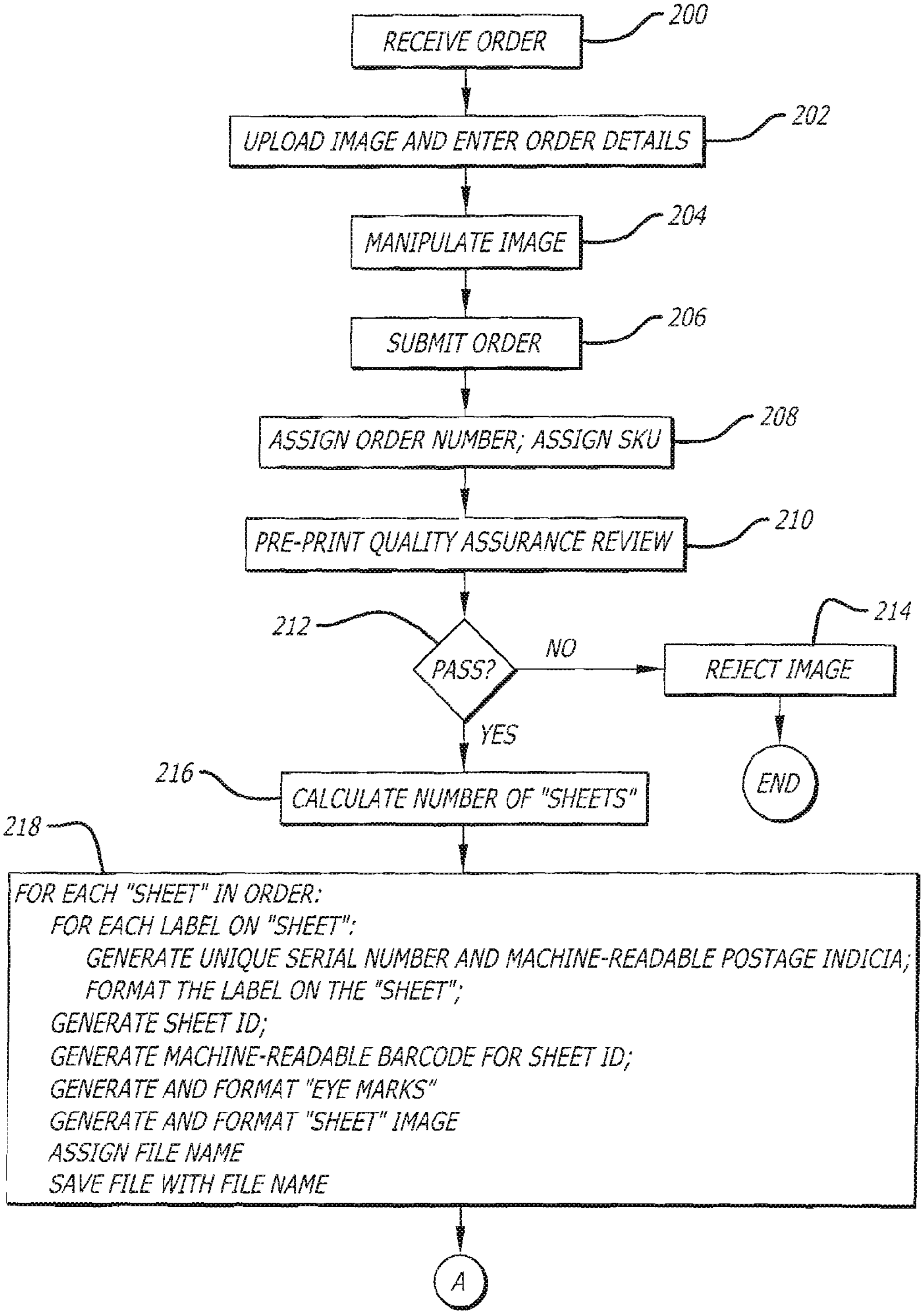

The exemplary embodiment of the present invention will be directed to rolls of USPS-approved, image-customized computer-based "IBIP" generic postage labels (sometimes referred to herein more simply as "image-customized postage labels").

It will be understood by someone with ordinary skill in the art that "IBIP" is an acronym for the "Information Based Indicia Program" provided by the United States Postal Service CUSPS"). The IBIP facilitates computer-based Postage, also sometimes referred to as PC-based (Personal Computer based; also sometimes referred to herein as PC Postage), or Internet-based, Postage. In a typical Internet-based postage system, a user can purchase postage credit, and print the postage in the form of PC Postage onto a label or directly onto a mail piece at a printer connected to the user's own computer.

It will be understood by someone with ordinary skill in the art that there are different types of IBIP postage. One type of IBIP postage is recipient-address specific and is date sensitive/date specific. Another type of IBIP postage is "generic" in that it is neither recipient-address specific or date sensitive/date specific.

U.S. patent application Ser. No. 09/975,532 entitled "SYSTEM AND METHOD FOR PROVIDING COMPUTER-BASED POSTAGE STAMPS" (which may sometimes be referred to hereinafter as the "Generic VBI Invention"), the contents and disclosures of which are hereby incorporated by reference in full herein for all purposes as if fully stated here, discloses systems and methods for the creation of generic VBI postage, such that no intended recipient address need be specified, verified or indicated in any way on the created postage. The systems and methods disclosed in the Generic VBI Invention provided for the generation and printing of generic VBI, such as generic postage, that may be used at any time for any recipient, much like pre-printed postage printed and sold by the USPS. The terms "generic postage," "generic Internet postage", "computer-based generic IBIP postage" and "computer-based postage" may be used synonymously herein to refer to postage that is non-recipient specific and/or non-date specific.

It will be understood by someone with ordinary skill in the art that image-customized postage labels are one type of value-bearing items ("VBI"). Value-bearing items include, among other things, postage, coupons, tickets, gift certificates, currency, money orders, vouchers and the like.

It will also be understood by someone with ordinary skill in the art that although the exemplary embodiment of the present invention is described with respect to USPS-approved, image-customized computer-based IBIP generic postage labels, the invention would apply equally to other types of VBI.

It will also be understood by someone with ordinary skill in the art that reference herein to image-customized postage labels is synonymous with reference to image-customized computer-based postage labels, image-customized computer-based postage-indicia-bearing items, customized computer-based postage labels and customized computer-based postage-indicia-bearing items.

Figure 8:
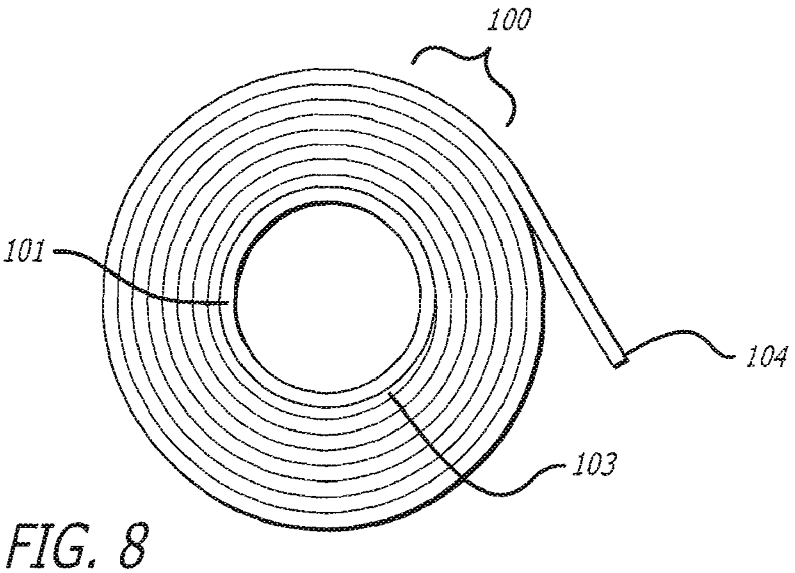
FIG. 8 is a graphic representation of a plan view of an exemplary roll of liner-backed, self-adhesive, image-customized postage labels in the exemplary embodiment of the present invention.

The output of the exemplary systems and methods of the present invention will be one or more exemplary rolls of liner-backed, self-adhesive, image-customized postage labels per an order placed by a customer. FIG. 8 is a graphic representation of a plan view of an exemplary roll 100 of liner-backed, self-adhesive, image-customized postage labels. As depicted in FIG. 8, an exemplary roll will comprise a label roll core 101. As will be understood by someone with ordinary skill in the art, an exemplary label roll core may comprise, for example, a hollow cylinder of some core material, such as stiff cardboard, around which a length of material can be rolled. In the case of the present invention, the length of material to be rolled around the roll core will comprise an exemplary length of liner-backed, self-adhesive, image-customized postage labels. In the exemplary embodiment of the present invention, the exemplary label roll core will comprise an inner diameter of three inches (3").

Figure 9:
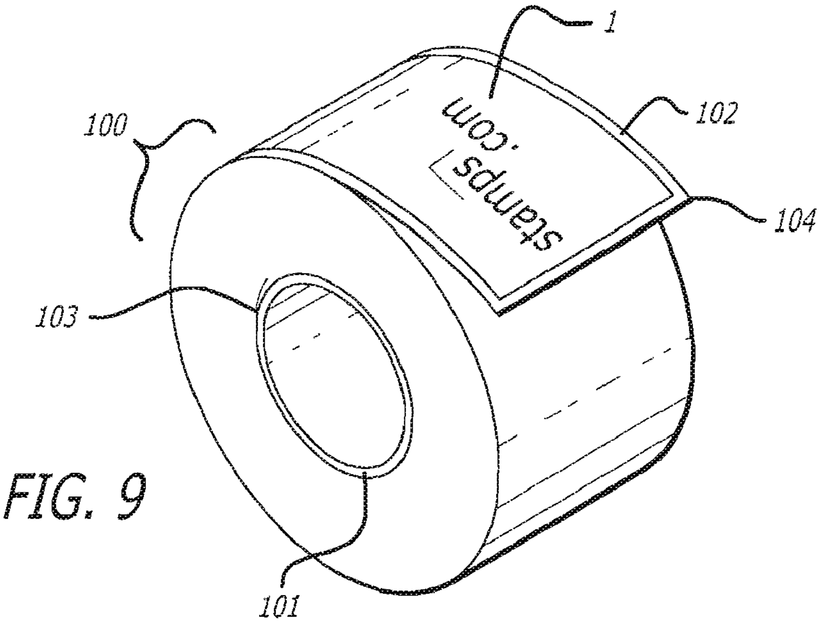
FIG. 9 is a graphic representation depicting a perspective view of an exemplary roll of exemplary liner-backed, self-adhesive, image-customized postage labels rolled around a roll core in the exemplary embodiment of the present invention.

In the exemplary embodiment, the exemplary length of liner-backed, self-adhesive, image-customized postage labels will comprise an exemplary length of label liner backing on which a plurality of adhesive-backed, image-customized postage labels are disposed. FIG. 9 is a graphic representation depicting a perspective view of the exemplary roll 100 of exemplary liner-backed 102, self-adhesive, image-customized postage labels 1 rolled around a roll core 101.

As will be understood by someone with ordinary skill in the art, a length of material to be rolled around a roll core will have a first end, sometimes referred to as a "tail" end, that can be attached to a roll core; a length of material to be rolled around a roll core will have a second end, sometimes referred to as the "dispensing" end. As will be understood by someone with ordinary skill in the art, the dispensing end is the outermost end of a roll of material.

In the exemplary embodiment of the present invention, returning with reference to FIG. 8, the exemplary length of label liner backing will comprise a first end (the "tail" end) 103 disposed on the label roll core, and a second end (the "dispensing" end) 104.

Figure 10:
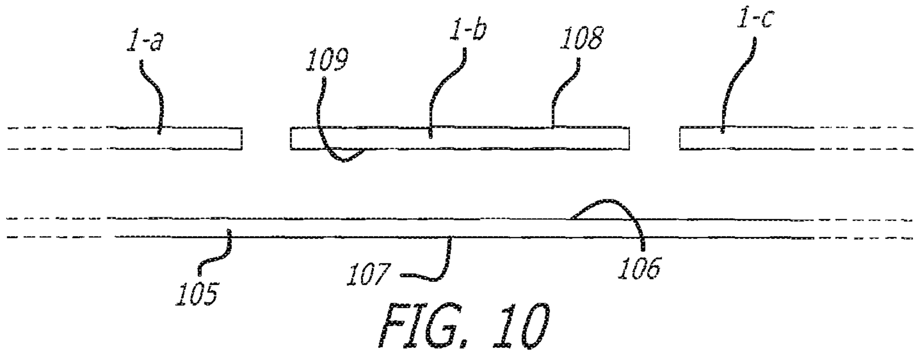
FIG. 10 is a graphic representation depicting a side plan view of an exemplary portion of an exemplary length of liner-backed, self-adhesive, image-customized postage labels in the exemplary embodiment of the present invention.

FIG. 10 is a graphic representation depicting a side plan view of an exemplary portion of an exemplary length of liner-backed, self-adhesive, image-customized postage labels. As depicted in FIG. 10, the exemplary length of liner-backed, self-adhesive, image-customized postage labels will comprise a label liner 105, sometimes referred to herein as a label liner backing. The exemplary length of label liner backing will comprise an upper liner surface 106, and an underneath liner surface 107.

The exemplary length of liner-backed, self-adhesive, image-customized postage labels depicted in FIG. 10 comprises a plurality of exemplary adhesive-backed, image-customized postage labels, e.g., 1-*a*, 1-*b* and 1-*c*, disposed on the upper liner surface 106. Each of the exemplary adhesive-backed, image-customized postage labels, e.g., label 1-*b*, comprises an upper label surface 108 and an underneath label surface 109. An adhesive is disposed on the underneath label surface 109 of each exemplary adhesive-backed, image-customized postage label. The upper label surface 108 of each exemplary adhesive-backed, image-customized postage label comprises a customized image (see element 2, FIG. 1A), a machine-readable postage indicia (see element 7, FIG. 1A), and a human-readable postage indicia (see element 5, FIG. 1A). The underneath label surface 109 is separably adhered to the upper liner surface 106.

FIG. 1A depicts a plan view of an exemplary image-customized postage label 1 in an exemplary embodiment of the present invention.

With reference to FIG. 1A, the exemplary image-customized postage label 1 will bear an image 2 that would be provided by a corresponding user, namely by the user that places an order for a certain quantity of image-customized postage labels.

In the exemplary embodiment, the user may provide an image for image-customization of postage labels in an electronic form, such as recorded on a CD or diskette, to a customer representative. Alternatively, the user may supply the image in hardcopy form, and the customer representative could scan the image.

Continuing with reference to FIG. 1A, the exemplary image-customized postage label 1 will bear an exemplary border 3 that will be selected by the customer representative user. In the exemplary embodiment, exemplary image-customized postage label 1 will comprise a particular postage label footprint characterized by a set of particular dimensions, e.g., width 9 and height 10. In the exemplary embodiment, width 9 will measure approximately 1.75 inches; height 10 will measure approximately 1.25 inches. In a variation of the exemplary embodiment, the user will be able to select one of a plurality of postage label footprints; each selectable footprint will be characterized by a corresponding height and width and a number of postage labels that will be formatted for a "sheet" as described further below.

In the exemplary embodiment, exemplary image-customized computer-based postage label 1 will be characterized by a perimeter 83. Further, each image-customized postage label 1 further comprises a top edge 83*a*, a bottom edge 83*b*, a left edge 83*c*, and a right edge 83*d*. In the exemplary embodiment, right edge 83*d*, as depicted in FIG. 1, is serrated.

In the exemplary embodiment, image 2 will measure approximately 1.1 inches wide by 1.1 inches in height; image 2 will cover approximately two-thirds of the face of the exemplary image-customized postage label 1. Further, the customized image 2 comprises a top 2*a*, a bottom 2*b*, a left side 2*c*, and a right side 2*d*.

The exemplary image-customized computer-based postage label 1 will bear a human-readable indication of the country 4 for which the postage is approved. The exemplary image-customized postage label 1 will also bear a human-readable indication of an amount of postage 5. The exemplary image-customized postage label 1 will also bear a human-readable identifier (such as a serial number) 6 that will uniquely identify the particular image-customized postage label. The exemplary image-customized postage label 1 will also bear a machine-readable set of information 7. In the exemplary embodiment, the exemplary machine-readable set of information (also referred to as machine-readable postage indicia) 7 will comprise a machine-readable representation of the serial number that uniquely identifies the particular image-customized postage label, a machine-readable representation of the amount of postage, and machine-readable representations of other information.

It will be understood by someone with ordinary skill in the art that the description herein of use in the exemplary embodiment of a machine-readable postage indicia (e.g., element 7 in FIG. 1) and human-readable postage indicia (e.g., element 6 in FIG. 1) is not a limitation of the present invention. Rather, the present invention applies equally to all types of postage indicia, whether now known or in the future discovered. Other types of postage indicia could be used in alternative embodiments of the present invention.

It will be understood by someone with ordinary skill in the art that a single machine-readable barcode may represent a plurality of items of information, such as, e.g., a serial number, and a postage value. Even though a barcode may graphically appear to be a singular item, it may represent a plurality of items of information. Therefore, unless otherwise expressly indicated, the terms indicia and indicium may be used interchangeably herein to refer to the singular and the plural.

More specifically, in the exemplary embodiment, the machine-readable postage indicia 7 will comprise 18 bytes of data and 2 bytes of encoder filler, structured according to the USPS Information Based Indicia Program IBI data dictionary format. *IBI Data Dictionary and Indicia Types*, Document version 5.2, USPS Information Based Indicia Program (IBIP), Sep. 29, 2003. In the exemplary embodiment, the machine-readable postage indicia 7 will be generated by a secure vault (the term "vault" is used herein to refer to a postage server located in a secure data center); the secure vault will maintain a one-to-one association of each serial number 6 uniquely identifying a particular image-customized computer-based postage label 1 with a corresponding, and similarly unique, machine-readable postage indicia 7; the secure vault will maintain a record of each serial number 6 uniquely identifying a particular image-customized computer-based postage label 1 and the corresponding, and similarly unique, machine-readable postage indicia 7.

FIG. 4 is a chart depicting content format for the machine-readable postage indicia 7 in the exemplary embodiment. As depicted in FIG. 4, in the exemplary embodiment, the machine-readable postage indicia 7 will be a 20-byte field that will include a 1-byte IBI standard Indicia Version number 441, a 2-byte Software ID 442, a 3-byte Postage Value 443, a 2-byte IBI Vendor number 444, a 2-byte Model ID 445, an 8-byte (12-digit) Indicia ID (serial) number 446 (see also, element 6, FIG. 1A) that references the unique indicia generated by the secure vault, and a 2-byte field containing Encoder values 447. In the exemplary embodiment, the content of the machine-readable postage indicia 7 will be encoded using a Data Matrix 2D barcode generator from IDAutomation, Inc.; the format will be 20 byte rectangular, with 20 mil element size. *ANSI/AIM BC11 International Symbology Specification*, "Data Matrix." Use in the exemplary embodiment of a Data Matrix 2D barcode is exemplary and non-limiting; machine-readable postage indicia 7 may comprise any other type of machine-readable representation, whether now known or in the future discovered.

Returning with reference to FIG. 1A, the exemplary image-customized computer-based postage label 1 will also bear a brand name 8 of the entity providing the image-customization of postage labels.

FIG. 1B, comprising FIGS. 1B-1 through 1B-3, is a high-level flow diagram depicting exemplary high level logic functions for producing an exemplary roll of image-customized postage labels in an exemplary embodiment of the present invention. Reference herein to FIG. 1B will be understood to refer to the collection of FIGS. 1B-1 through 1B-3.

With reference to FIG. 1B, in the exemplary embodiment of the present invention, an exemplary method for producing an exemplary roll of image-customized postage labels will comprise a customer representative receiving a request 200 from a customer for a roll of a certain number of exemplary image-customized postage labels.

In the exemplary embodiment, the customer representative will then interact with an exemplary image-customizing postal label computer system to enter the order. It will be understood by someone with ordinary skill in the art that the description of a customer representative receiving a customer's order or taking other actions as described herein is not a limitation of the present invention. Rather, in an alternative embodiment, a customer could enter an order directly into the exemplary image-customizing postal label computer system without assistance by a customer representative and without departing from the spirit of the invention.

FIG. 2A is a block diagram depicting an exemplary Internet user client/server environment for the exemplary image-customizing postal label computer system in an exemplary embodiment of the present Invention. It will be understood by someone with ordinary skill in the art that although the exemplary embodiment of the present invention is described in the context of an Internet-based embodiment, that the present invention is not limited to Internet-based applications.

With reference to FIG. 2A, user client devices 10*a*-10*z* (sometimes referred to herein simply as "client", "clients" or "client computers") and a postage label customization website 19 will engage in two-way communication via a communication network 12.

In the exemplary embodiment, communication network 12 will comprise the Internet. However, it will be understood by those skilled in the art that the communication network may take many different forms, such as a local area network (LAN), wide area network (WAN), wired telephone network, wireless network, or any other network that supports data communication between respective entities.

Clients 10*a*-10*z* may embody one of a variety of different forms. In one illustrative embodiment, one or more of Clients 10*a*-10*z* may comprise personal computers; other of Clients 10*a*-10*z* may comprise computers or any other device, whether now known or in the future discovered, that has processing capabilities and that may engage in communication over a communications network such as communication network 12.

Each respective client device 10*a*-10*z* will be in communication with a respective display device 11*a*-11*z*. Each respective display device, e.g., in the example using client 10*a*, display device 11*a*, will be integral to, or connected to, or otherwise in communications with, the respective client device, e.g., 10*a*.

Clients 10*a*-10*z* will be in communications with the communication network 12 through communication links 14*a*-14*z*. A communication link e.g., 14*a*, could comprise a wireless communication, a dedicated line connection, cable communication, satellite communication, telephone communication, or any other type of communication now known or in the future discovered. In addition, each client, e.g., client 10*a*, may have access to a printer, such as printer 18*a*. Optionally, a local network may serve as the connection between some of the clients and the Internet 12.

The postage label customization website 19 will also be in communication with the Internet via one or more communication links, e.g., 25. As with communication links 14*a*-14*z* between the client devices 10*a*-10*z* respectively, communication links, e.g., 25, between the postage label customization website 19 and the Internet could comprise a wireless communication, a dedicated line connection, cable communication, satellite communication, telephone communication, or any other type of communication now known or in the future discovered.

A web browser 1002, such as, for example, NETSCAPE NAVIGATOR®, or MICROSOFT INTERNET EXPLORER®, or some other web browser software, will be installed on each client device, e.g. 10*a*. Reference herein to web browser 1002 should not be read as referring to any particular web browser brand. Further, reference to a web browser 1002 should not be read as implying that every client computer, e.g., 10*a* through 10*z*, all use the same web browser. Rather, each client computer 10*a* through 10*z* will have one web browser, that could be selected from various web browsers, whether now known or in the future discovered, with which to control communications between the respective client device, e.g., 10*a*, and the Internet. Further, it will be understood by someone with ordinary skill in the art that the invention will apply to any computer program or set of computer instructions, whether a web browser or some other software now known or in the future discovered, that is adapted to allow a user to retrieve and render hyper-media content from one or more server computers available for communication via a communications network, such as the Internet.

It should be noted that the use of suffixes such as "a" through "z" in connection with numbered elements of the FIGURES herein are exemplary and are not a limitation of the invention to any particular number. Rather, the suffixes "a" through "z", and similar notations, are used herein to an unknown number of similar elements; although the number is unknown, the "a" through "z" suffix notation is used to express a representation of 1 to many.

Communications between a client computer, e.g., 10*a*, and the postage label customization website 19 will be provided via secured eCommerce communications, such as through SSL; HTTPS, which stands for "Hypertext Transfer Protocol over Secure Socket Layer", is an acronym that is often used to describe such a secured eCommerce communications. However, it will be understood by someone with ordinary skill in the art that reference to SSL or HTTPS herein is not a limitation of the invention. Rather, other communication protocols, whether now known or in the future discovered, could be used.

SSL stands for "Secure Sockets Layer," a protocol developed by NETSCAPE® for transmitting private documents via the Internet. SSL works by using a private key to encrypt data that is then transferred over the SSL connection. Both NETSCAPE NAVIGATOR® and MICROSOFT INTERNET EXPLORER® web browsers, support SSL; many websites use SSL protocol to protect the exchange of confidential user information, such as credit card numbers.

In the exemplary embodiment, the customer representative will use a client device, e.g., Client computer 10*a*, to access the postage label customization website 19.

Returning with reference to FIG. 1B, in the exemplary embodiment of the present invention, the exemplary method for producing an exemplary roll of image-customized postage labels will further comprise a customer representative using online user interface tools to direct the exemplary image-customizing postal label computer system to, as depicted in function block 202, upload a digital image provided by the customer and to enter details about the order, such as, e.g., the postage denomination amount for each postage label, and the number of postage labels ordered.

The exemplary embodiment of the present invention is described herein with reference to a customer representative uploading a customer's image for preparation of an order. It will be understood by someone with ordinary skill in the art that the description of customer representative user of the exemplary embodiment is not a limitation of the present invention and that, without departing from the spirit of the invention, alternative embodiments could be developed in which customers would be users via customer-accessed client computers 10*a*-10*z*.

Further, it will be understood by someone with ordinary skill in the art, that description of the exemplary embodiment with reference to a communications network is not a limitation of the invention. Rather, without departing from the spirit of the invention, in a further alternative embodiment of the invention, the computer software functions described herein could be resident on exemplary client device 10*a*.

Figure 2B:
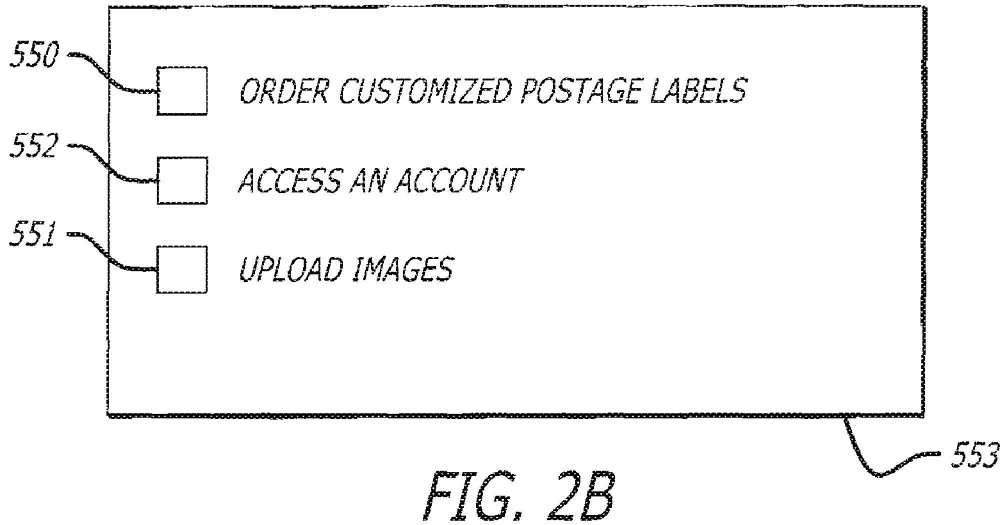
FIG. 2B is a graphic representation depicting a screen shot of an exemplary user interface home page screen in an exemplary embodiment of the present invention.

FIG. 2B is a graphic representation depicting a screen shot of an exemplary user interface home page screen 553 in an exemplary embodiment of the present invention. Accessing the exemplary user interface home page screen depicted in FIG. 2B, the customer representative could select the option to Upload an Image 551 to upload a digital representation of an image, e.g., image 2 depicted in FIG. 1A, from, for example, an electronic copy provided by the customer or from a scanned in copy of a hardcopy image provided by the customer.

Once an image has been uploaded, the customer representative could, for example, select the option to Access an Account 552 to enter payment information provided by the ordering customer.

Figure 3:
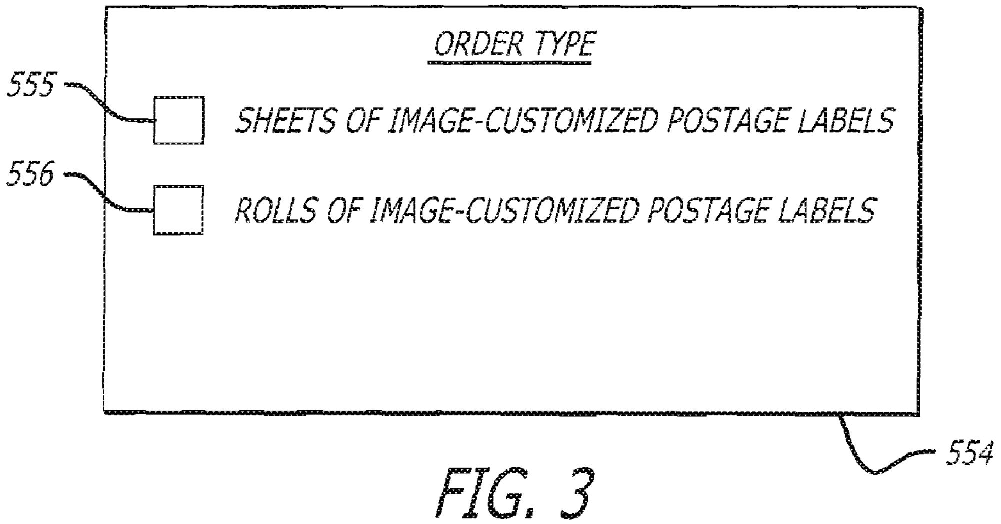

Once an image has been uploaded, the customer representative could select the option to Order Customized Postage Labels 550, which would cause the presentation of an Order Type screen, e.g., 554 depicted in FIG. 3.

FIG. 3 is a graphic representation depicting a screen shot of an exemplary user interface order type screen in an exemplary embodiment of the present invention. Accessing the exemplary order type screen 554 depicted in FIG. 3, the customer representative could select the option to order Rolls of Image-Customized Postage Labels 556. Alternatively, the customer representative could select the option to order Sheets of Image-Customized Postage Labels 555, as was described in some detail in U.S. patent application Entitled: "IMAGE-CUSTOMIZATION OF COMPUTER-BASED VALUE-BEARING ITEMS"; application Ser. No. 10/994,698, filed on Nov. 22, 2004, the entire contents and disclosure of which has previously been incorporated by reference in full herein for all purposes.

In the exemplary embodiment, the customer representative user will use a user interface similar to the one described in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes) to prepare an order for one or more rolls of image-customized postage labels.

If the customer representative selects the option to order Rolls of Image-Customized Postage Labels 556 depicted in FIG. 3, then the exemplary system will next present an exemplary screen comprising a blank customizable postage label template, such as exemplary blank customizable postage label template 530 as depicted in FIG. 5.

FIG. 5 is a graphic representation depicting a screen shot of an exemplary user interface blank postage label template screen 500 that depicts a representation of an exemplary blank customizable postage label template 530 in the exemplary embodiment of the present invention.

As depicted in FIG. 5, the representation of the exemplary blank customizable postage label template 530 will comprise a display of a country identifier 531, a blank customizable postage amount field 532, a blank customizable image field 534, a customizable border field 533, a brand name 523, a mock postage indicia field 522, and a mock serial number 521. The exemplary blank customizable postage label template 530 will provide only a mock postage indicia field 522 because actual machine-readable postage indicia will be generated in a later function described below. Further, the exemplary blank customizable postage label template 530 will provide only a mock serial number 521 because an actual serial number will be generated in a later function.

The exemplary user interface blank label template screen 500 will provide an onscreen button 520 that, when clicked by the user, will facilitate the user selecting a new image with which to customize the blank customizable image field 534.

If the user clicks the select-a-new-image button 520, a list will be displayed (not shown) of the images in the user's gallery. If the user clicks the select-a-new-image button 520, and if a particular image that the user wants to use is not displayed in the user's gallery list, the user will need to upload the particular image and then select it from the user's gallery list.

If, on the other hand, the user clicks the select-a-new-image button 520, and the particular image that the user wants to use is listed in the user's gallery list, the user will be able to click on the "click & drag" field 504 on the exemplary user interface blank postage label template screen 500, click on the listing of the desired image, and drag the desired image to the blank customizable image field 534 (see element 534' described below with reference to FIG. 6). Once the blank customizable image field 534 has been filled with the particular image, the user would be able to click on the "click & drag" field 504 to reposition the image within the image field (see element 534' described below with reference to FIG. 6).

Continuing with reference to FIG. 5, the user will be able to select a postage amount (labeled Select Postage 501) by clicking on a pull-down postage amount menu button 502.

Doing so will cause the display of the certain postage denomination amounts, such as, e.g., $0.24, $0.39, $0.52, $0.63, $0.87, $1.11 and $4.05. Moving the online cursor to the desired postage denomination amount and highlighting the desired postage denomination amount will cause the selected postage amount to appear in both the selected postage amount field 503, and will also customize the blank customizable postage amount field 532 (see element 532' described below with reference to FIG. 6).

In the exemplary embodiment, the exemplary user interface blank postage label template screen 500 will also provide a border customization field 512 with forward 511*b* and backward 511*a* buttons to scroll through a plurality of border color and/or pattern options. In the exemplary embodiment, the default border color/pattern will be a particular solid color, e.g., black. If a user selects a customized border, the customizable border field 533 will be customized according to the user's selection (see element 533' described below with reference to FIG. 6). In the exemplary embodiment, border color options will include: black (the default color), dark blue, red, light blue, orange, dark grey, yellow, green, violet, or white. Border color options in the exemplary embodiment are exemplary and non-limiting; other colors could be supported without departing from the spirit of the present invention. In the exemplary embodiment, when white is selected as the border color, postage value (see element 532' described below with reference to FIG. 6) will be dark blue.

In the exemplary embodiment, the exemplary user interface blank postage label template screen 500 will also provide an input field for a Number of Stamps per roll 560 and a total number of rolls 561; a Cost field 535 will be initially presented as blank.

It will be understood by someone with ordinary skill in the art that the exemplary embodiment of the present invention will be useful in that it will provide a customer with the ability to request virtually any quantity (with the understanding that, for reasons explained further below, in the exemplary embodiment, the quantity will need to be a multiple of 32) of image-customized postage labels (up to some potential limit not specified herein) as compared to the standard quantities (e.g., 500, 3,000, 10,000) of pre-cancelled stamps sold by the USPS.

Once a user has selected a postage amount 503, and has input a Number of Stamps per roll 560 and a total number of rolls 561, the exemplary embodiment will calculate the number of postage labels that is the closest number to the Number of Stamps per roll input by the user that is divisible by 32 (see element 560' described below with reference to FIG. 6); the total cost field 535 will be updated (see element 535' described below with reference to FIG. 6) with the amount calculated by multiplying the calculated Number of Stamps per roll (see element 560' in FIG. 6) by the number of rolls (see element 561' in FIG. 6) by the postage denomination amount (see element 503' in FIG. 6).

It will be understood by someone with ordinary skill in the art that the description of the number 32 as the denominator for calculating the total number of stamps per roll is exemplary and not a limitation of the invention.

In the exemplary embodiment, the exemplary user interface blank postage label template screen 500 depicted in FIG. 5 will also provide various image manipulation buttons (zoom in 505, zoom out 506; rotate counterclockwise 507, rotate clockwise 508; flip sideward 509, flip upward 511*b*; a reset button 513). The image manipulation buttons will be useable by the user once the user has customized the blank customizable image field 534.

It will be understood by someone with ordinary skill in the art that the user will be able to separately customize each customizable field (e.g., image 534, border 533, postage denomination amount 532, Number of Stamps per roll 560 and total rolls 561) on the exemplary user interface blank postage label template screen 500 depicted in FIG. 5 and that the exemplary preview display of the customized postage label in the exemplary embodiment will reflect each interim customization. It will be understood by someone with ordinary skill in the art that, rather than provide a preview display of each feature as a user provides customization instructions, an alternative embodiment could provide an onscreen preview button; once the user had completed inputting customization instructions, the user would click the preview button to cause a display of the customized postage label preview.

With reference to FIG. 1B, the customer representative will use online user interface tools to manipulate 204 the digital image to provide the orientation and effect directed by the customer.

FIG. 6 is a graphic representation depicting a screen shot of an exemplary user interface customized postage label preview screen 500' in the exemplary embodiment of the present invention. The exemplary user interface customized postage label screen 500' shown in FIG. 6 depicts a user's border selection 512' of a red border; a user's postage amount selection 503' of thirty-nine cents (39¢) for 1 oz. First Class Mail; a customized postage label 530' reflecting the user-customized postage amount 532', the user-customized border 533', the user-customized image 534', a Number of Stamps per roll 561' that has been updated to reflect the next highest number closest to the number of stamps requested by the user that is divisible by 32, the user-input total rolls 561', and a cost field 535' that has been updated to reflect the total amount of postage.

In the exemplary embodiment, if the number of postage labels/stamps requested by the user was not divisible by 32, then the exemplary embodiment of the present invention would round up to the next highest number divisible by thirty-two (32). In an alternative embodiment, the number could be rounded down to the next lowest number divisible by thirty-two (32).

With reference to function 206 depicted in FIG. 1B, once the image is properly oriented and presented, the order can be submitted for fulfillment to the exemplary image-customizing postal label computer system.

Once a user has completed inputting the image and other information for an order and is satisfied with the image 534' such as depicted in FIG. 6, with reference to FIG. 1B, the order can be submitted 206 for fulfillment to the exemplary image-customizing postal label computer system. With reference to FIG. 6, the user could click on the "Check Out" button 536 to submit the order.

It will be understood by someone of ordinary skill in the art that the description of a single image per order in the exemplary embodiment is not a limitation of the invention. Rather, in some embodiments, a single order could be submitted requesting a roll of image-customized postage labels for one image, a second roll of image-customized postage labels for a second image, etc.

With reference to function 208 depicted in FIG. 1B, once an order has been submitted, the order will be assigned an order number 208 (sometimes referred to herein as an "Order ID") and the order will be queued for presentation to pre-print Quality Assurance 210. In the exemplary embodiment of the present invention, the order will be assigned an order number and the order will be queued for presentation to pre-print Quality Assurance in much the same way as is disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes).

In the exemplary embodiment of the present invention, the order number assigned will be unique. However, it will be understood by someone with ordinary skill in the art that the order number could be non-unique in alternative embodiments.

With reference to function 208 depicted in FIG. 1B, once an order has been submitted, the order will be assigned a SKU. In the exemplary embodiment of the present invention, twenty-eight (28) distinct SKU's will be provided for assigning to orders for rolls of image-customized postage labels. In the exemplary embodiment, seven different postage value denominations e.g., $0.24, $0.39, $0.52, $0.63, $0.87, $1.11 and $4.05, will be available for selection for orders for rolls of image-customized postage labels. Further, in the exemplary embodiment, four (4) different quantities of rolls may be ordered—an order in the exemplary embodiment may request a single roll, two (2) rolls, four (4) rolls, or eight (8) rolls. Therefore, the exemplary image-customizing postal label computer system of the exemplary embodiment of the present invention will be programmed to assign one of the available twenty-eight (28) distinct SKU's an order, depending on, and according to, the particular combination of postage value denomination and roll quantity as specified for the particular order.

In alternative embodiments, the image-customizing postal label computer system could be programmed to assign an SKU depending on an additional number of postage value denominations, an additional number of quantities of rolls, or additional factors. For example, if an additional postage value denomination is made available in an alternative embodiment, say, for example, $1.35, then the alternative embodiment of the image-customizing postal label computer system could be programmed to assign an additional four (4) SKUs—one additional SKU for the additional postage value denomination for each of the four (4) roll quantities—that is, a total of thirty-two (32) SKUs would be available for assignment by the system.

In a further alternative embodiment of the present invention, customer representatives could be presented with additional options for selection for an order, such as, for example, information regarding the customers postage label applicator. Such additional options could be indicated, for example, on an alternative version of the user interface screen depicted in FIGS. 5 and 6. Such customer postage label applicator information may comprise an indication of a manufacturer and model identifier. Alternatively, such customer postage label applicator information could comprise specific information about the customer's postage label applicators operational characteristics, such as, for example, a.) the maximum outer diameter of a roll of labels that can be processed by the customer's applicator; b.) the maximum width of a roll of labels that can be processed by the customer's applicator; and c.) an indication of the speed (such as a number of labels applied per minute) at which the customer's applicator applies postage labels. As a further alternative, the alternative system could provide input fields in which the customer representative could, for an order, input (or select from a list of available options) a particular type of liner backing, a maximum outer roll diameter, and/or a maximum roll width.

In one alternative embodiment, the image-customizing postal label computer system could be programmed to display a list (such as in one or more pull down menus) of manufacturers and model numbers of postage applicators from which the customer representative could indicate a selection of an applicator manufacturer and a model identifier. In such an alternative embodiment, the image-customizing postal label computer system could be programmed, according to the selected indication of the manufacturer and model number, to retrieve from a database, information about the particular postage label applicator's operational characteristics. For example, information could be retrieved from a database indicating, according to the selected indication of the manufacturer and model number: a.) the maximum outer diameter of a roll of labels that can be processed by the customer's applicator; b.) the maximum width of a roll of labels that can be processed by the customer's applicator; and c.) an indication of the speed (such as a number of labels applied per minute) at which the customer's applicator applies postage labels. Or, alternatively, the same type of information (outer diameter, width and speed) could be input by the customer representative. As a further alternative, the system could provide input fields in which to indicate for the order the maximum outer diameter of a roll, the maximum width of a roll, and the type of label stock/backing to be used.

In such an alternative embodiment, once information about the operational characteristics of the customer's applicator has been determined, the image-customizing postal label computer system could be programmed to then select, according to the indicated operational characteristics of the customer's applicator, one of a plurality of group numbers and/or one of a plurality of SKUs. Group numbers and SKUs would be used by a printer operator and/or a finisher later in the process, for example, to determine and use a particular label stock type for the corresponding order, and certain dimensions for rolling the ordered image-customized postage labels.

Pre-print Quality Assurance is managed by the exemplary image-customizing postal label computer system of the exemplary embodiment of the present invention in much the same way as disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes). Generally, the exemplary image-customizing postal label computer system will queue the ordered image for review by one or more pre-print Quality Assurance reviewers/users. When the position of an ordered image in the queue is ready for review, the exemplary image-customizing postal label computer system will present the ordered image for review by one or more pre-print Quality Assurance reviewers/users; once the one or more pre-print Quality Assurance reviewers/users have reviewed the ordered image and entered an indication of approval or denial of the image, the exemplary image-customizing postal label computer system will receive the indication from the one or more pre-print Quality Assurance reviewers/users of approval or denial of the ordered image.

With reference to function 214 depicted in FIG. 1B, if the ordered image does not pass pre-print Quality Assurance review, the image will be rejected 214. If, on the other hand, the ordered image passes pre-print Quality Assurance review, then further functions will be performed to prepare the order for fulfillment.

In the exemplary embodiment of the present invention, the exemplary image-customizing postal label computer system will format for rendering on printable label stock, "sheets" of image-customized postage labels. Therefore, once the image for an order has passed pre-print Quality Assurance, a number of "sheets" are calculated (sometimes referred to herein as the "total sheets [or files] in the order") as shown in function 216 of FIG. 1B.

Figure 7:
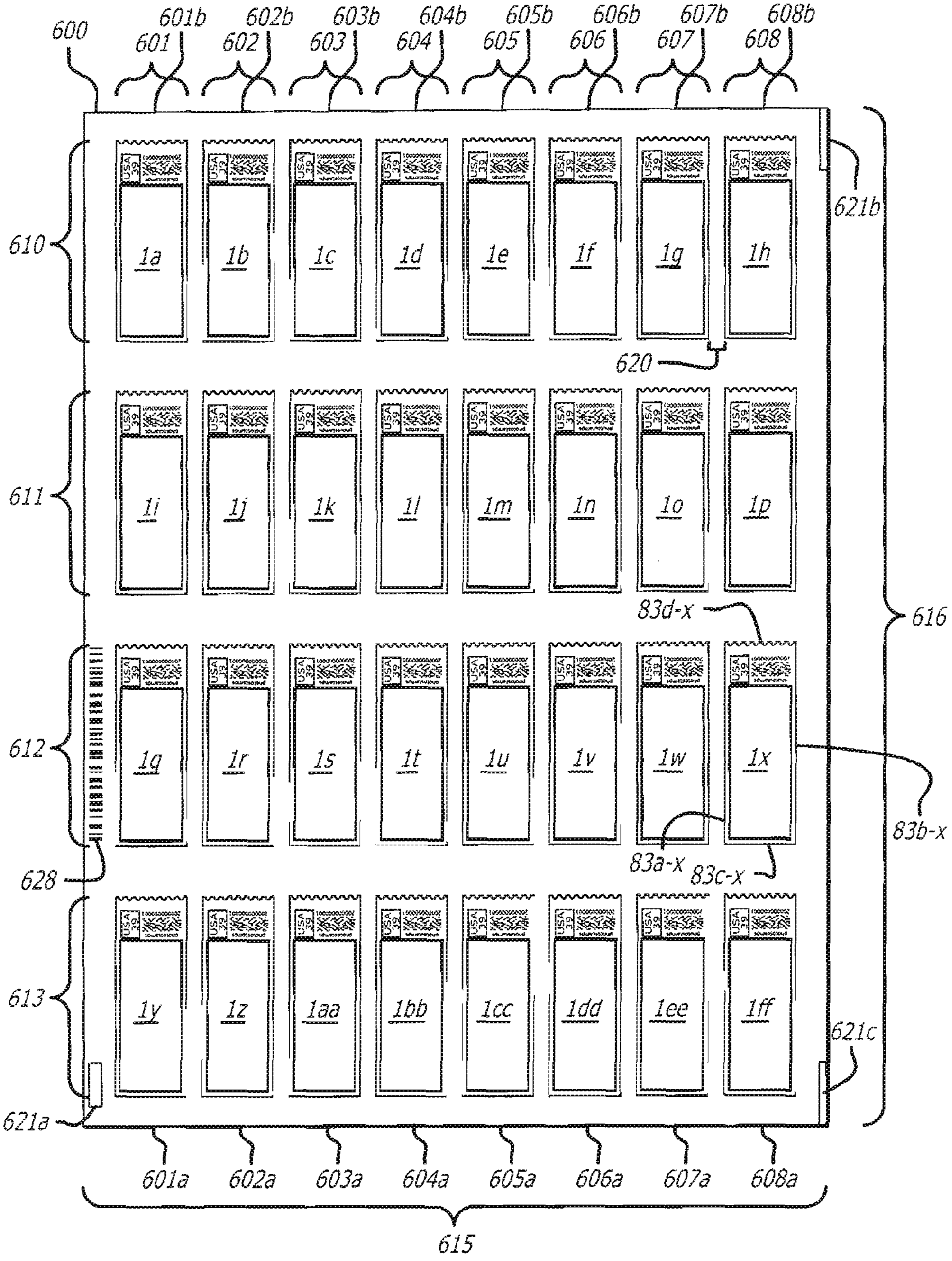
FIG. 7 is a graphic representation depicting a plan view of an exemplary "sheet" of image-customized postage labels in the exemplary embodiment of the present invention.

FIG. 7 is a graphic representation depicting a plan view of an exemplary "sheet" 600 of image-customized postage labels. As illustratively depicted in FIG. 7, an exemplary "sheet" 600 will comprise eight (8) columns 601-608 and four (4) rows 610-613 of image-customized postage labels 1*a* through 1*ff*. Each column has a "tail" end 601*b*-608*b*, and a dispensing end 601*a* through 608*a*.

Each exemplary "sheet" 600 has a width 615 and a height 616. In the exemplary embodiment of the present invention, a thirteen inch (13") wide roll (or "web") of pressure sensitive, liner-backed, self-adhesive label stock will be used as an exemplary medium on which to render image-customized postage labels. Therefore, in the exemplary embodiment, the width 615 of a "sheet" 600 is thirteen (13) inches.

In the exemplary embodiment of the present invention, each image-customized postage label will be surrounded on all sides by a blank sheet area. On the exemplary "sheet" 600, a space, e.g., 620 of approximately ⅛ inch will be provided between each postage label in a row.

In the exemplary embodiment of the present invention, in order to calculate the number of "sheets", the exemplary image-customizing postal label computer system will be programmed to multiply the exemplary number of four (4) rows by the exemplary number of eight (8) columns to produce the result of thirty-two (32) image-customized postage labels per exemplary "sheet". Alternatively, the number thirty-two (32) could simply be provided to the exemplary image-customizing postal label computer system as the standard number of image-customized postage labels per exemplary "sheet".

Continuing with function 216 depicted in FIG. 1B, in the exemplary embodiment of the present invention, the exemplary image-customizing postal label computer system will be programmed to divide the number of image-customized postage labels ordered by the customer by the standard number of image-customized postage labels per exemplary "sheet" to calculate a certain number of "sheets" of image-customized postage labels that need to be formatted and rendered on printable label stock.

In the exemplary embodiment of the present invention, once the number of "sheets" has been calculated, the exemplary image-customizing postal label computer system will be programmed to format each "sheet" of the certain number of "sheets" that need to be formatted.

Continuing with function 218 depicted in FIG. 1B, in the exemplary embodiment of the present invention, for each "sheet" to be formatted, the exemplary image-customizing postal label computer system will be programmed to generate and format a sheet image of a plurality of (in the exemplary embodiment, specifically, thirty-two (32)) image-customized postage labels. (As mentioned above, in the exemplary embodiment of the present invention, each sheet image will comprise four (4) rows of image-customized postage labels and eight (8) columns of image-customized postage labels).

In the exemplary embodiment of the present invention, each image-customized postage label will comprise a customized image (element 2, FIG. 1), a machine-readable postage indicia (element 7, FIG. 1), a human readable serial number (element 6, FIG. 1), and a human readable country/human-readable postage indicia (elements 4 and 5, FIG. 1). Therefore, in order to format a sheet image, as mentioned in function 218 in FIG. 1B, for each "Sheet" in an order, for each label on the "Sheet", the exemplary image-customizing postal label computer system will be programmed to generate a unique serial number and a machine-readable postage indicia and will be programmed to format the respective label image and format the respective label image as it will appear on the "sheet" in a particular column and row of the sheet image.

It will be understood by someone with ordinary skill in the art that the description herein of use in the exemplary embodiment of a machine-readable postage indicia and human-readable postage indicia is not a limitation of the present invention. Rather, the present invention applies equally to all types of postage indicia, whether now known or in the future discovered. Other types of postage indicia could be used in alternative embodiments of the present invention.

In the exemplary embodiment of the present invention, a unique serial number will be assigned and a machine-readable postage indicia will be generated and formatted for each image-customized postage label in much the same way as is disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes).

With reference to FIG. 7, with reference to, e.g., exemplary image-customized postage label 1*x*, in the exemplary embodiment of the present invention, in generating a sheet image, each label image will be formatted for orientation in the respective sheet image such that the left edge, e.g., 83*c*-*x* of postage label 1*x*, will be oriented toward the dispensing end, e.g., 608*a*, of the column, e.g., 608, in which the label is positioned; the right edge, e.g., 83*d*-*x* of postage label 1*x*, will be oriented toward the tail end, e.g., 608*b*, of the column, e.g., 608, in which the label is positioned. The exemplary orientation of each label image described above with respect to the respective sheet image will be provided in the exemplary embodiment of the present invention so that the left edge, e.g., 83*c*-*x* of postage label 1*x*, will be dispensed first.

Continuing with reference to function 218 depicted in FIG. 1B, in the exemplary embodiment of the present invention, the exemplary image-customizing postal label computer system will be programmed to generate and assign to each sheet image a Sheet Identifier ("Sheet ID") that identifies the corresponding "sheet". In the exemplary embodiment of the present invention, Sheet IDs will comprise certain elements described further below.

Continuing with reference to function 218 depicted in FIG. 1B, in the exemplary embodiment of the present invention, once a Sheet ID is assigned to a sheet image, the exemplary image-customizing postal label computer system will be programmed to format a barcode comprising a machine-readable representation of the Sheet ID and to incorporate the formatted barcode in an area of a perimeter margin of the corresponding sheet image.

Continuing with reference to function 218 depicted in FIG. 1B, in the exemplary embodiment of the present invention, the exemplary image-customizing postal label computer system will be programmed to create and format "eye marks" and to incorporate the "eye marks" in certain areas of the perimeter margins of the corresponding sheet image. Exemplary "eye marks" 621*a*, 621*b*, and 621*c* are depicted in the perimeter margins of the exemplary sheet depicted in FIG. 7 (and in FIG. 12).

As will be understood by someone with ordinary skill in the art, "eye marks" can be used by certain finishing equipment to, for example, apply surface features to a printed product. In the exemplary embodiment of the present invention, "eye marks" will be formatted and incorporated as part of each exemplary sheet image so that once the sheet image has been printed, the "eye marks" can be used by certain finishing equipment to guide the positional application of a pattern of invisible fluorescent ink on the printed surface of each image-customized postage label on the printed sheet.

In the exemplary embodiment of the present invention, the exemplary image-customizing postal label computer system will be programmed to generate the sheet images in the form of Portable Data Format ("PDF") files in much the same way as disclosed in U.S. patent application Entitled: "IMAGE-CUSTOMIZATION OF COMPUTER-BASED VALUE-BEARING ITEMS"; application Ser. No. 10/994,698, filed on Nov. 22, 2004 (the entire contents and disclosure of which has previously been incorporated by reference in full herein for all purposes; see, e.g., page 49, line 24 through page 60, line 16 discussing, among other things, FIG. 14A of that application).

Figure 12:
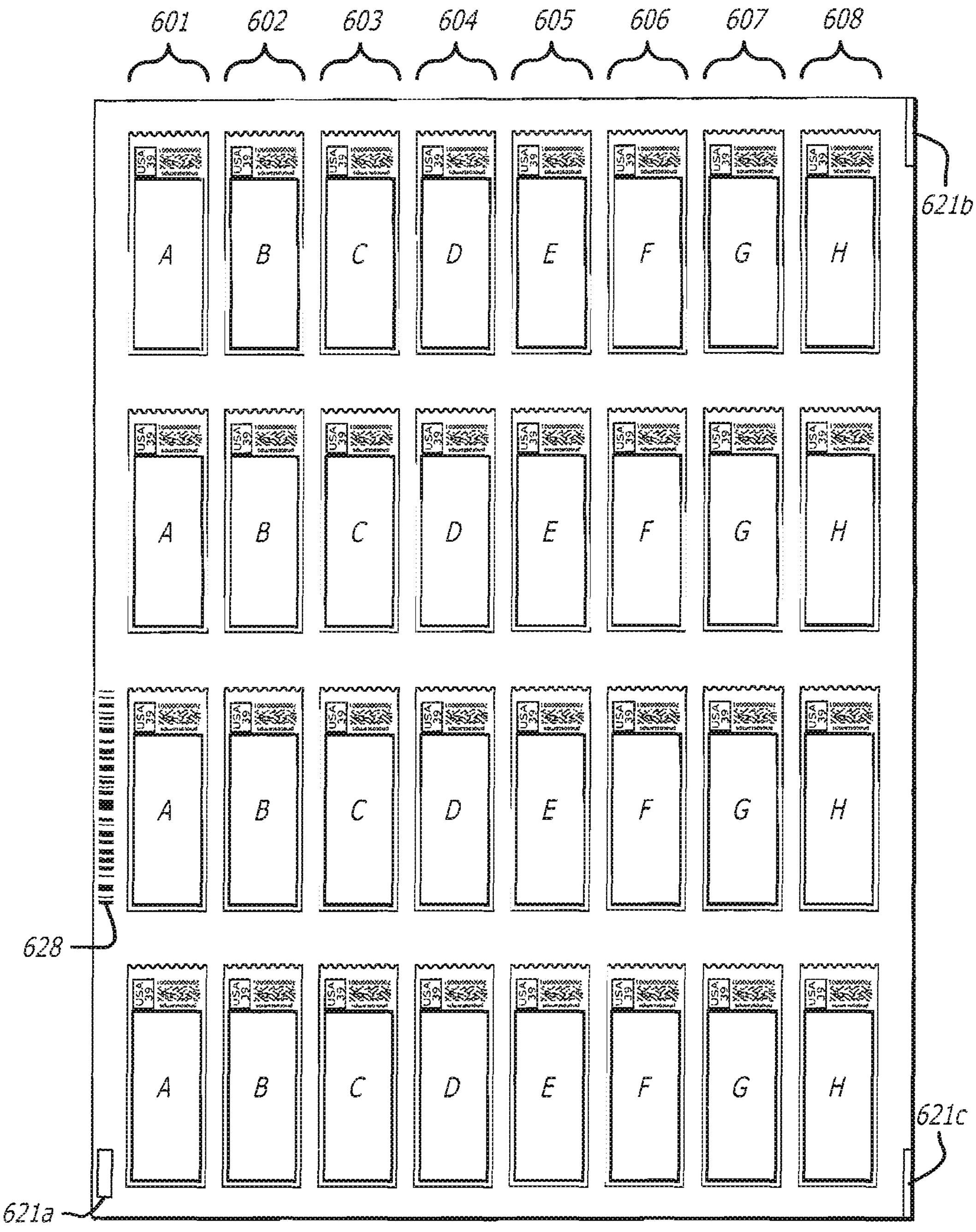
FIG. 12 is a graphic representation of a plan view of an exemplary sheet in an alternative exemplary embodiment of the present invention.

Continuing with reference to function 218 depicted in FIG. 1B, in the exemplary embodiment of the present invention, once a sheet image has been completely formatted, including all thirty-two (32) image-customized postage label images, a machine-readable Sheet ID barcode image, and "eye mark" images, the exemplary image-customizing postal label computer system will be programmed to save the sheet image as a file with a particular file name. FIGS. 7 and 12 depict an exemplary Sheet ID barcode 628 and exemplary "eye marks" 621*a*, 621*b*, and 621*c* on an exemplary sheet and on an alternative exemplary sheet respectively.

In the exemplary embodiment of the present invention, Sheet ID's and sheet image file names will comprise a file group ID of "900", an order counter (such as the Order ID) that is unique to each order, a sheet/file number (which represents the particular sheet/file within the order), and a total sheets/files in the order (which remains fixed for each order and which was calculated as previously described above by dividing the total number of postage labels ordered by thirty-two (32)). Sheet ID's additionally will comprise a number of rolls requested by the customer.

In an alternative embodiment of the present invention in which a customer representative would have indicated, as described above, either an indication of a manufacturer and model identifier of a customer's postage applicator, or specific information about the customer's postage label applicator's operational characteristics, additional group numbers would be used to indicate to a printer operator and/or a finisher later in the process, for example, a particular label stock type for the corresponding order, and certain dimensions for rolling the ordered image-customized postage labels. For example, a group number of "1000" could be assigned to orders for which an upgraded liner backing is required (as described further below).

With reference to function 220 depicted in FIG. 1B, in the exemplary embodiment of the present invention, the exemplary image-customizing postal label computer system will be programmed to periodically save a batch of saved sheet image files onto an encrypted hard drive for printing.

With reference to function 222 depicted in FIG. 1B, the exemplary image-customizing postal label computer system will be programmed to also create a file of the Sheet ID's corresponding to the sheet image files saved in the batch. In the exemplary embodiment of the present invention, the sheet image files saved in the batch will have been sorted so that the sheeVfile numbers within the order (in the Sheet ID/File Name) are in sequential order. In the exemplary embodiment of the present invention, the exemplary image-customizing postal label computer system will be programmed to count the total number of sheets/files in a batch and ensure that all of the sheets/files in the batch are present and in sequential order, as compared to the total sheets/files in the order (as previously described above as an element of the Sheet ID/File Name).

In the exemplary embodiment of the present invention, the exemplary image-customizing postal label computer system will populate and print a shipping manifest for shipment with the fulfilled order of image-customized postage labels. An exemplary shipping manifest will provide the following types of information: Client Code (Exemplary value always equals SIAM); File Type (Exemplary value always equals ORDER); Shipping Type (Exemplary value always equals PHOTO-STAMPSROLL); Order ID; Shipping Group ID; Line Item ID; Sheet ID; Date Purchased; Shipping first name; Shipping last name; Shipping company name; Shipping address 1; Shipping address 2; Shipping city; Shipping state; Shipping zip; SKU; Quantity (Number of SKU's to be shipped); Personal Message (Provided by customer); Shipping Method; Number of items in shipment (Equals the number of items in the shipping group); and Number of lines in file (Equals the number of lines in the daily shipping file).

In the exemplary embodiment of the present invention, the batched file will then be converted to a format that can be used by a print-rendering device (such as a printer); the resulting converted file will be provided to a print-rendering device. In the exemplary embodiment of the present invention, a high-speed label printer, such as, for example, an HP® Indigo press ws4050 (produced by Hewlett-Packard Company of 20 Perimeter Summit Blvd., Atlanta, Ga.) will be used as an exemplary device for rendering image-customized postage labels onto the exemplary thirteen inch (13") wide pressure sensitive, liner-backed, self-adhesive label stock.

It will be understood by someone with ordinary skill in the art that description of use in the exemplary embodiment of a roll of exemplary thirteen inch (13") wide pressure sensitive, liner-backed, self-adhesive label stock is not a limitation of the present invention. Rather, sheets of pressure sensitive, liner-backed, self-adhesive label stock could be used in an alternative embodiment. Further, alternative print-rendering devices could be used that would operate with rolls of a different width.

In the exemplary embodiment of the present invention, the pressure sensitive, liner-backed, self-adhesive label stock used will meet both USPS postage label specifications and will meet requirements for high-speed postage applicator devices, such as high-speed postage applicator devices made by, e.g., VERTIS MANUFACTURING. For example, in the exemplary embodiment, the exemplary default label stock will be fifty-four pound (54#) white semi-gloss label stock; the default label stock will have a permanent adhesive that meets USPS postage label specifications that require that the label, once applied, cannot be removed from the medium to which it has been applied after forty-eight (48) hours of the label having been applied without tearing either the label or the medium. For example, in the exemplary embodiment, the default label stock will have a permanent acrylic emulsion adhesive. In the exemplary embodiment, the default label stock will have a forty pound (40#) "SCK" liner backing. In the exemplary embodiment, image-customized postage labels will be printed using a four-color (polychromatic) ink process of at least 300 by 300 dots per inch (300×300 dpi).

As will be understood by someone with ordinary skill in the art, a number of manufacturers make postage label applicators. Each make and model may differ in operational characteristics. For example, some makes (manufacturer) and models of postage label applicators operate to apply labels at less than 100 labels per minute. For such makes and models, the above-mentioned label stock with the above-mentioned exemplary forty pound (40#) "SCK" liner backing would be appropriate. However, some makes and models may operate to apply labels at a rate higher than 100 labels per minute. For such higher-speed applicators, the above-mentioned exemplary forty pound (40#) "SCK" liner backing may not be appropriate. For such higher-speed applicators, an upgraded liner, such as for example, a forty-four pound (44#) PK liner, may better withstand the higher speed application.

In an alternative embodiment of the present invention, as previously described above, an alternative user interface would be provided that would allow a customer representative to indicate, for example, a manufacturer and model identifier of a customers postage applicator, or provide, for example, specific information about the customer's postage label applicator's operational characteristics. In such an alternative embodiment, special group numbers and/or SKU's would be assigned by the alternative system to an order to indicate to a printer operator and/or a finisher later in the process, for example, the particular label stock/liner type for the corresponding order.

In order for an alternative embodiment of the image-customizing postal label computer system to assign an SKU that includes an indication of the type of one additional label stock/liner that should be used, rather than twenty-eight (28) SKUs as described above for the exemplary embodiment, a total of fifty-six (56) SKUs would be provided for assignment by the system—one for each possible combination of seven (7) postage amount denominations, four (4) quantities of rolls, and two (2) liner types.

Further, many postage applicators operate with a maximum outer roll diameter, and/or a maximum roll width that may differ from make to make and/or from model to model. In an alternative embodiment of the present invention, further special group numbers and/or SKU's would be assigned by the alternative system to an order to indicate to a printer operator and/or a finisher later in the process particular outer roll diameter and roll width dimensions for a particular order. For example, in an embodiment which provided eight (8) postage amount denominations, six (6) roll quantities, two (2) liner types, and two (2) outer roll diameter options, a total of one hundred ninety-two (192) distinct SKUs would be provided and selectable by the system, according to the indication by the customer service representative of the selected postage amount denomination, the roll quantity, a particular liner type (or operational characteristics, or a make and model, of the customers label applicator), and a particular maximum roll diameter (or operational characteristics, or a make and model, of the customer's label applicator).

With reference to function 224 depicted in FIG. 1B, in the exemplary embodiment of the present invention, the print rendering device will render each sheet image file in the order on to a respective sheet portion of a roll of liner-backed adhesive label stock.

With reference to function 226 depicted in FIG. 1B, in the exemplary embodiment of the present invention, once the sheet images for an order have been printed, the Sheet ID barcode on each sheet will be scanned.

With reference to function 228 depicted in FIG. 1B, in the exemplary embodiment of the present invention, an exemplary print manifest computer program will be executed that will check all of the scanned Sheet ID's for an order to ensure that all of the sheets in an order have been printed, that no duplicate sheets have been printed, and that all of the sheets are in sequential order.

With reference to function 230 depicted in FIG. 1B, in the exemplary embodiment of the present invention, the exemplary print manifest computer program will report missing sheets, duplicate sheets and out of order sheets for manual resolution.

With reference to function 232 depicted in FIG. 1B, in the exemplary embodiment of the present invention, the printed label stock for all "Sheets" in an order will then be fed through a special piece of equipment that applies a pattern of fluorescent ink to each image-customized postage label on each "Sheet" in the order and that kiss-cuts a border around each image-customized postage label on each "Sheet" in the order. In the exemplary embodiment of the present invention, a device such as an OMEGA DIGICON™ S (provided by ABG International) will be used to apply the fluorescent ink pattern and kiss-cut the labels.

Continuing with reference to function 232 depicted in FIG. 1B, in the exemplary embodiment of the present invention, a device such as an OMEGA DIGICON™ S (provided by ABG International) will be used to apply clear (sometimes referred to as "invisible") fluorescent ink to each printed postage label on each "sheet" of image-customized postage labels in an order. A particular pattern of (clear/invisible) fluorescent ink will be applied in order to facilitate cancellation by the postal service. In the exemplary embodiment of the present invention, the fluorescent ink will meet USPS requirements for a target 620 nm wave length luminescence and red indicator; and will have luminescence levels less than twenty-three (23) PMU on a red fluorescent sensor. The clear (invisible) fluorescent pattern will be applied in the exemplary embodiment of the present invention in a manner so that the clear fluorescent pattern can be detected by a USPS AFCS (Automated Facing Cancellation System) during facing and sorting operations by the USPS.

It will be understood by someone with ordinary skill in the art that application of a pattern of fluorescent ink to each exemplary image-customized postage label is not a limitation of the invention. Other means, whether now known or in the future discovered, could be used to facilitate USPS automated facing and cancellation without departing from the spirit of the present invention.

In the exemplary embodiment, the "eye marks" on each "sheet" of the order will be used by the device applying the fluorescent ink (such as an OMEGA DIGICON™ S (provided by ABG International)), to determine with precision the location on each sheet for application of the fluorescent ink.

Figure 11:
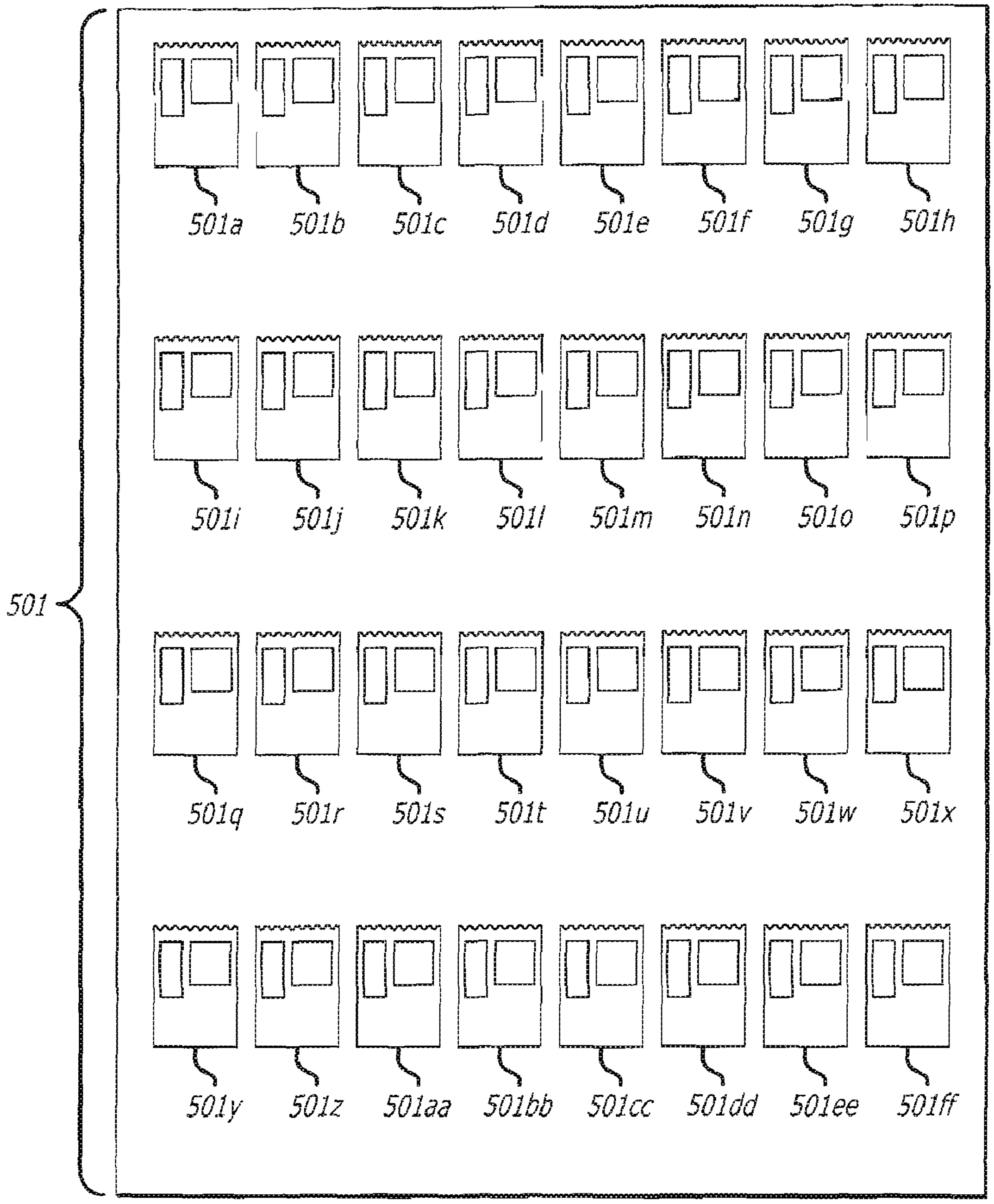
FIG. 11 is a graphic representation depicting an exemplary pattern of fluorescent ink for application to printed sheets of image-customized postage labels in an exemplary embodiment of the present invention.

FIG. 11 is a graphic representation depicting an exemplary pattern 501 of fluorescent ink for application to printed sheets of image-customized postage labels in the exemplary embodiment of the present invention. As depicted in FIG. 11, in the exemplary embodiment of the present invention, the pattern 501 of fluorescent ink will comprise a plurality of fluorescent ink patterns 501*a* through 501*ff*. In the exemplary embodiment of the present invention, the pattern 501 of fluorescent ink would be applied on a "sheet" of printed image-customized postage labels, such as the "sheet" of printed image-customized postage labels 1*a* through 1*ff* depicted, e.g., in FIG. 7, so that each fluorescent ink pattern 501*a* through 501*ff* would be applied to each of the image-customized postage labels 1*a* through 1*ff* (see FIG. 7), respectively, on the sheet.

It will be understood by someone with ordinary skill in the art that the individual fluorescent ink patterns 501*a* through 501*ff* depicted in FIG. 11, once applied, will surround, and will not overlay or interfere with, the country designation 4/human-readable postage indicia 5 as depicted in FIG. 1 and the brand 8/machine readable postage indicia 7/serial number 6 as depicted in FIG. 1 on each image-customized postage label 1*a* through 1*ff* (see FIG. 7), respectively, on the sheet; the individual fluorescent ink patterns 501*a* through 501*ff* depicted in FIG. 11, once applied, will not overlay or interfere with any portion of the customized image 2 or border 3 as depicted in FIG. 1 on each image-customized postage label 1*a* through 1*ff* (see FIG. 7), respectively, on the sheet.

Continuing with reference to function 232 depicted in FIG. 1B, in the exemplary embodiment of the present invention, a device such as an OMEGA DIGICON™ S (provided by ABG International) will be used to kiss-cut a border around each image-customized postage label on each "Sheet" in the order so that the kiss-cut will pierce the adhesive-backed label but will not pierce the label liner. It will be understood by someone with ordinary skill in the art that the description of the exemplary embodiment of kiss-cutting the liner-backed, self-adhesive label stock so that the kiss-cut will pierce the adhesive-backed label but will not pierce the label liner is not a limitation of the invention.

In the exemplary embodiment, the image-customized postage label will be kiss-cut so that at least one-thirty-second of an inch (1/32") of clear space will surround the printed image of the entire image-customized postage label on all sides. That is, there will be at least one-thirty-second of an inch (1/32") of clear space between the printed image of the entire image-customized postage label and the kiss-cut on all sides. Because there will be a space between each image-customized postage label, kiss-cutting a border around each image-customized postage label will leave residual adhesive-backed label stock in between the borders.

With reference to function 234 depicted in FIG. 1B, in the exemplary embodiment of the present invention, once the labels for an order have been kiss-cut, the label stock for the order will be fed through a piece of equipment that will remove the residual adhesive-backed label stock from the label liner, including trimming the perimeter borders of each sheet to remove the Sheet ID barcode and the "eye marks." In the exemplary embodiment of the present invention, a device such as an OMEGA DIGICON™ S (provided by ABG International) will be used to remove the residual adhesive-backed label stock from the label liner.

With reference to function 236 depicted in FIG. 1B, in the exemplary embodiment of the present invention, once the residual adhesive-backed label stock has been removed from the label liner and the perimeter borders have been trimmed, the portion of the roll of liner-backed adhesive label stock comprising all of the "Sheets" for the order will be fed through a piece of equipment, such as, for example, an OMEGA DIGICON™ S (provided by ABG International), that will slice the roll in between each column of image-customized postage labels.

The sliced roll columns will form lengths of liner-backed, image-customized postage labels that each have a first "tail" end and a second "dispensing" end.

With reference to function 240 depicted in FIG. 1B, the first "tail" end of a sliced column length of liner-backed, image-customized postage labels will be attached to a roll core. In the exemplary embodiment of the present invention, a roll core with a three-inch (3") inside diameter will be used. In the exemplary embodiment of the present invention, a device such as an OMEGA DIGICON™ S (provided by ABG International) will be used to attach a sliced column length of liner-backed, image-customized postage labels to a roll core.

With reference to function 242 depicted in FIG. 1B, the sliced column length of liner-backed, image-customized postage labels will then be rolled around the roll core to form a roll of image-customized postage labels. In the exemplary embodiment, the sliced column length of liner-backed, image-customized postage labels will be rolled around the roll core clock-wise. In the exemplary embodiment of the present invention, a device such as an OMEGA DIGICON™ S (provided by ABG International) will be used to roll sliced column lengths of liner-backed, image-customized postage labels around respective roll cores, clock-wise.

In the exemplary embodiment of the present invention, depending on the specifications of a particular order, it may be appropriate to splice columns together on a roll to form continuous length of liner-backed, image-customized postage labels for the order. If splicing is appropriate for an order, in the exemplary embodiment, a separate piece of equipment, such as, for example, an OMEGA SYSTEMS™ Label Inspection and Slitter Rewinder (e.g., Model TT270/SR range; provided by ABG International), would be used to splice a tail end of a column to a dispensing end of the liner-backed, image-customized postage labels already on the roll. In the exemplary embodiment, the spliced length would then be rolled, clockwise (using, for example, an OMEGA SYSTEMS™ Label Inspection and Slitter Rewinder (e.g., Model TT270/SR range; provided by ABG International)).

The description of the exemplary embodiment above is provided with reference to a single image per order and a single image per sheet. In one alternative exemplary embodiment of the present invention, each order would be formatted for a particular column of a plurality of "sheets." That is, each column on a particular sheet would correspond to a customized image and a postage denomination amount of a particular order.

In such an alternative exemplary embodiment of the present invention, a sheet of liner-backed self-adhesive image-customized postage labels would comprise a plurality of columns of image-customized postage labels, wherein each image-customized postage label in a particular column of the plurality of columns would comprise a particular image of a plurality of images, wherein the plurality of images would correspond to the plurality of columns, and wherein each image of the plurality of images would correspond to a particular respective order of a plurality of orders.

FIG. 12 is a graphic representation of a plan view of an exemplary sheet in such an alternative exemplary embodiment of the present invention. As depicted in FIG. 12, a first order for image A (and for a postage denomination amount as specified for the first order) would be formatted for column 601. A second order for image B (and for a postage denomination amount as specified for the second order) would be formatted for column 602. A third order for image C (and for a postage denomination amount as specified for the third order) would be formatted for column 603. A fourth order for image D (and for a postage denomination amount as specified for the fourth order) would be formatted for column 604. A fifth order for image E (and for a postage denomination amount as specified for the fifth order) would be formatted for column 605. A sixth order for image F (and for a postage denomination amount as specified for the sixth order) would be formatted for column 606. A seventh order for image G (and for a postage denomination amount as specified for the seventh order) would be formatted for column 607. An eighth order for image H (and for a postage denomination amount as specified for the eighth order) would be formatted for column 608.

In such an alternative embodiment, each order would be formatted for a particular column of a plurality of "sheets." In such an alternative embodiment, a number of orders corresponding to the number of columns on each sheet would all be formatted and generated for rendering at the same time. Instead of formatting an entire sheet for a particular order, an order would be formatted and generated for a particular column. In an embodiment where a sheet comprises thirty-two (32) postage labels, the above-described functions of formatting and generating images for an order would use the number four (4) (the number of rows on each sheet) as the basis to calculate the number of sheets needed for formatting all of the postage labels for the order.

In one such alternative embodiment, orders for the same number of image-customized postage labels would be "batched" together; each column on a sheet of the batch would each comprise an image-customized postage label for a particular order in the batch. For example, eight different orders, for eight different images, each order for an order-specific postage denomination amount, and each order for, e.g., 200 image-customized postage labels, could be "batched" together to be formatted for rendering on fifty (50) consecutive sheets. Image-customized postage labels for each of the eight different orders would be formatted for a particular respective column of the fifty (50) sheets.

In such an alternative embodiment, Sheet IDs and file names would be constructed, for example, using a batch number representing, for example, a composite of the various unique order numbers assigned to the various orders represented on a sheet in the batch.

In such an alternative embodiment, once the appropriate number, e.g., eight (8), orders were batched together, sheets comprising, e.g., eight (8) columns, one column for each corresponding order in the batch, would be formatted; an image file would be generated for each sheet.

Other features of the invention are implicit in the above-provided description and/or are depicted and/or implicit in the accompanying Figures.

Facsimile Reproduction of Copyright Material

A portion of the disclosure of this patent document contains material which is subject to copyright protection by the copyright owner, Stamps.com Inc., it successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

The invention claimed is:

1. A method of producing a roll of image-customized postage labels, said method comprising:

A) 1) receiving a user input of a user-provided image, user instructions for formatting the user-provided image, and a user-specified postage amount, 2) generating a label-specific machine-readable representation of date-independent, recipient-address-independent, computer-based postage indicia comprising the user-specified postage amount for each image-customized postage label on each sheet to be formatted, and 3) formatting a plurality of sheet images of a plurality of image-customized postage labels, wherein each sheet image of the plurality of image-customized postage labels comprises a first plurality of rows of image-customized postage labels and a second plurality of columns of image-customized postage labels, wherein each image-customized postage label comprises a customized image of the user-provided image according to said user instructions and a set of postage indicia comprising a particular label-specific machine-readable representation of date-independent, recipient-address-independent, computer-based postage indicia comprising the user-specified postage amount;

B) rendering each sheet image of the plurality of image-customized postage labels on liner-backed adhesive label stock;

C) slicing the liner-backed adhesive label stock in between each column of the second plurality of columns of image-customized postage labels, and D) disposing the second plurality of columns of image-customized postage labels in a roll, wherein mounting said roll on a label applicator device facilitates label application of said image-customized postage labels on to mail items.

2. The method of claim 1, wherein rendering each sheet image in B) comprises rendering each sheet image of the plurality of image-customized postage labels on a respective portion of a roll of liner-backed adhesive label stock; and wherein slicing the liner-backed adhesive label stock in C) comprises slicing the roll of liner-backed adhesive label stock through each respective portion of the roll of liner-backed adhesive label stock in between each column of the second plurality of columns of image-customized postage labels.

3. The method of claim 1, wherein rendering each sheet image in B) comprises rendering each sheet image on a sheet of liner-backed adhesive label stock; and wherein slicing the liner-backed adhesive label stock in C) comprises slicing each sheet of liner-backed adhesive label stock.

4. The method of claim 1, wherein disposing the second plurality of columns of image-customized postage labels in a roll comprises rolling a first end of a first column of the second plurality of columns of image-customized postage labels around a label roll core.

5. The method of claim 1, wherein disposing the second plurality of columns of image-customized postage labels in a roll comprises:

D-1) splicing a tail end of a second column to a head end of a first column; and D-2) rolling a tail end of the first column around a label roll core.

6. The method of claim 1, wherein the liner-backed adhesive label stock comprises a label liner comprising an upper liner surface and wherein the liner-backed adhesive label stock further comprises an adhesive-backed label means separably adhered to the upper liner surface, said method further comprising, after performing B) and prior to performing C):

B-1) kiss-cutting a border around each image-customized postage label on each sheet image so that the kiss-cut pierces the adhesive-backed label means but does not pierce the label liner, leaving residual adhesive-backed label means in between the borders; and B-2) removing the residual adhesive-backed label means.

7. The method of claim 1, wherein each column of the second plurality of columns comprises a respective tail end and a respective head end, wherein said customized image comprises a left side and a right side, and wherein each said sheet image comprises said plurality of image-customized postage labels such that each said image-customized postage label is oriented in a landscape orientation with respect to a landscape orientation of said sheet image such that the left side of said customized image of each particular image-customized postage label is oriented toward the tail end of a particular respective column in which the particular image-customized postage label is disposed, wherein mounting said roll on a label applicator device facilitates horizontal, side-to-side label application of said landscape-oriented, image-customized postage labels on to mail items.

8. The method of claim 7, wherein disposing the second plurality of columns of image-customized postage labels in a roll comprises:

D-1) splicing a tail end of a second column to a head end of a first column; and D-2) rolling a tail end of the first column around a label roll core.

9. The method of claim 7, wherein the liner-backed adhesive label stock comprises a label liner comprising an upper liner surface and wherein the liner-backed adhesive label stock further comprises an adhesive-backed label means separably adhered to the upper liner surface, said method further comprising, after performing B) and prior to performing C):

B-1) kiss-cutting a border around each image-customized postage label on each sheet image so that the kiss-cut pierces the adhesive-backed label means but does not pierce the label liner, leaving residual adhesive-backed label means in between the borders; and B-2) removing the residual adhesive-backed label means.

10. The method of claim 9, wherein disposing the second plurality of columns of image-customized postage labels in a roll comprises:

D-1) splicing a tail end of a second column to a head end of a first column; and D-2) rolling a tail end of the first column around a label roll core.

11. A method of producing a roll of landscape-oriented image-customized postage labels, said method comprising:

A) 1) receiving a user input of a user-provided image, user instructions for formatting the user-provided image, and a user-specified postage amount, 2) generating a label-specific machine-readable representation of date-independent, recipient-address-independent, computer-based postage indicia comprising the user-specified postage amount for each image-customized postage label on each sheet to be formatted, and 3) formatting a plurality of landscape-oriented sheet images of a plurality of landscape-oriented, image-customized postage labels, wherein each landscape-oriented sheet image of the plurality of landscape-oriented, image-customized postage labels comprises a first plurality of rows of image-customized postage labels and a second plurality of columns of landscape-oriented image-customized postage labels, wherein each landscape-oriented, image-customized postage label comprises a customized image of the user-provided image according to said user instructions and a set of postage indicia comprising a particular label-specific set of machine-readable representation of date-independent, recipient-address-independent, computer-based postage indicia comprising the user-specified postage amount, wherein each column comprises a tail end and a head end, wherein said customized image for each particular image-customized postage label comprises a left side and a right side, and wherein each said landscape-oriented image-customized postage label is provided in a landscape orientation with respect to a landscape orientation of a respective landscape-oriented sheet image of said plurality of landscape-oriented sheet images, such that the left side of said customized image of each particular landscape-oriented, image-customized postage label is oriented toward the tail end of a particular respective column in which the particular landscape-oriented image-customized postage label is disposed;

B) rendering each landscape-oriented sheet image of the plurality of landscape-oriented image-customized postage labels on liner-backed adhesive label stock;

C) slicing the liner-backed adhesive label stock in between each column of the second plurality of columns of landscape-oriented image-customized postage labels;

D) splicing a tail end of a second column to a head end of a first column; and

E) rolling a tail end of the first column around a label roll core to form a roll comprising the first column and second column, wherein mounting said roll on a label applicator device facilitates horizontal, side-to-side label application of said landscape-oriented, image-customized postage labels on to mail items.

12. The method of claim 11, wherein the liner-backed adhesive label stock comprises a label liner comprising an upper liner surface and wherein the liner-backed adhesive label stock further comprises an adhesive-backed label means separably adhered to the upper liner surface, said method further comprising, after performing B) and prior to performing C):

B-1) kiss-cutting a border around each landscape-oriented image-customized postage label on each landscape-oriented sheet image so that the kiss-cut pierces the adhesive-backed label means but does not pierce the label liner, leaving residual adhesive-backed label means in between the borders; and B-2) removing the residual adhesive-backed label means.

13. The method of claim 11, said method further comprising:

determining a particular label stock type for use as the liner-backed adhesive label stock, said particular label stock type determined according to a user-indication of operational characteristics for a particular postage label applicator.

14. The method of claim 1, said method further comprising:

determining dimensions for rolling the plurality of image-customized postage labels, said dimensions for rolling determined according to a user-indication of operational characteristics for a particular postage label applicator.

15. The method of claim 11, wherein said machine-readable representation of computer-based postage indicia is oriented toward the head end of the particular respective column in which the particular landscape-oriented, image-customized postage label is disposed.

* * * * *